(12) United States Patent
Dean et al.

(10) Patent No.: US 7,690,440 B2
(45) Date of Patent: Apr. 6, 2010

(54) SECTIONAL METER SHUT-OFF AND AGRICULTURAL IMPLEMENT HAVING SECTIONAL METER SHUT-OFF

(75) Inventors: Brian F. Dean, Langbank (CA); Patrick M. Beaujot, Langbank (CA); David R. Duke, Langbank (CA); Bruce W. Wilton, Langbank (CA); Barry K. Melanson, Kennedy (CA); Justin C. Varjassy, Langbank (CA); Ward J. Hepting, Regina (CA); Dave Hundeby, Saskatoon (CA)

(73) Assignee: One Pass Implements Inc., Langbank, SK (CA)

( * ) Notice: Subject to any disclaimer, the term of this patent is extended or adjusted under 35 U.S.C. 154(b) by 0 days.

(21) Appl. No.: 12/037,732

(22) Filed: Feb. 26, 2008

(65) Prior Publication Data

US 2009/0079624 A1    Mar. 26, 2009

Related U.S. Application Data

(60) Provisional application No. 60/974,351, filed on Sep. 21, 2007.

(51) Int. Cl.
*A01C 7/00* (2006.01)
*A01C 9/00* (2006.01)
*A01C 15/00* (2006.01)
*G06F 7/70* (2006.01)
*G06F 19/00* (2006.01)

(52) U.S. Cl. .................. 172/179; 172/182; 172/200; 172/900; 701/50

(58) Field of Classification Search .................. 111/179, 111/170, 177, 178, 180–182, 200, 900
See application file for complete search history.

(56) References Cited

FOREIGN PATENT DOCUMENTS

| CA | 1275986 | 11/1990 |
|---|---|---|
| CA | 2111611 A1 | 6/1995 |
| CA | 2151020 A1 | 12/1996 |
| CA | 2311698 A1 | 12/2001 |
| CA | 2503174 A1 | 4/2006 |
| CA | 2566248 A1 | 9/2007 |

OTHER PUBLICATIONS

International Search Report for PCT/CA2008/001838, mailed Jan. 29, 2009.

*Primary Examiner*—Christopher J. Novosad
(74) *Attorney, Agent, or Firm*—Howrey LLP; Viola T. Kung

(57) ABSTRACT

An agricultural seeder or fertilizer having a meter device which dispenses seed or fertilizer to a plurality of ground-engaging members. The supply of metered seed or fertilizer to each of the ground-engaging members is controlled via input from a GPS/GNSS satellite navigation system to prevent the meter device delivering seed or fertilizer to selected of the ground-engaging members which would otherwise pass over soil which has been previously seeded or fertilized. Raising means, responsive to input from said GPS/GNSS satellite navigation system detecting that the device is travelling or is about to travel over areas of soil that has been previously seeded or fertilized, is further is provided to raise the selected ground-engaging members to which delivery of seed/fertilizer has been prevented in order to prevent soil which has been previously seeded or fertilized from being disturbed. A method of operating a seeder/fertilizer implement to achieve the aforesaid is further disclosed.

17 Claims, 20 Drawing Sheets

SECTIONAL METER SHUT-OFF AND AGRICULTURAL IMPLEMENT HAVING SECTIONAL METER SHUT-OFF

This application claims priority under 35 U.S.C. §119(e) of U.S. Provisional Application No. 60/974,351, filed Sep. 21, 2007, which is incorporated herein by reference in its entirety.

FIELD OF THE INVENTION

The present invention relates generally to the field of air seeding systems, and more particularly to metered air seeding and/or fertilizing systems.

BACKGROUND OF THE INVENTION

Air seeders/fertilizer apparatus are commonly used in agricultural operations to apply particulate materials including one or more of the following, namely seed, fertilizer and/or innoculants into soil during the planting operation. These apparatus are often comprised of a wheeled cart that includes one or more tanks and meters to both hold and meter particulate materials. The metered particulate material is delivered to the soil through pneumatic pipes that attach to ground-engaging openers which engage soil and permit delivery of particulate material such as seed or fertilizer to furrows which are created in such soil by the ground-engaging openers.

Historically, farm sizes have increased and likewise field sizes have increased. As such, the necessary seeding/fertilizing equipment has become larger and more efficient. However, larger equipment proves to be difficult when attempting to seed/fertilize a smaller piece of land within a larger piece of land, or a piece of land with an irregular shape such as a triangle. (When seeding, these land irregularities create a significant overlap in the area of soil being seeded and/or fertilized.) As a result, the cost expended on seed and fertilizer is in excess of what is necessary for proper seeding and fertilizing. Additionally, over-fertilization and/or over-seeding of an area causes the crop to lodge and not ripen at the appropriate time causing harvest problems and losses in yield. The accumulative effect of the seeding and fertilizing overlap in small sections over many fields can become a very significant expense to a farmer.

Prior art implements have sought to remedy this situation by implementing a metering device in the seeder than can apply a specific quantity of seed per linear distance. However, the prior art has not resolved the problem that double seeding can occur when the land seeded is too narrow or odd shaped for the seeding device. Further, the prior art has not resolved the problem that even though the meter has been turned off, ground-engaging openers are still engaging the ground and destroying the seed bed. This causes the seeded area which is overlapped to be destroyed by the ground-engaging openers resulting in uneven germination causing further problems with a poor crop and an uneven harvest in these areas.

Canadian Patent 2,503,174 provides for a multi-compartment air seeding system where each compartment is assigned to a selected air stream based on the volume or type of seed and fertilizer required for a specific crop. A metering assembly is provided which comprises a metering house 80 for receiving the seed or fertilizer material as well as a metering roller for metering the material. Metering cells then collect the material for seeding. Diverter plates are also provided to move front and backwards to open and close the tops of either the front and rear material cells.

U.S. Pat. No. 5,980,163 further provides a distribution manifold for an air seeder for dispensing product. Further, it provides by-passed ports and venturi ports, the venturi ports making up the row of ports in which product from the product tank associated with the primary distribution manifold is to be deposited. The by-pass ports make up the remainder of rows in the primary distribution manifold. If the venturi ports do not make up the top row of ports in the primary distribution manifold, product from the associated product tank flows through rows of by-pass ports until the product encounters a row of venturi ports. Following entering into the venturi ports, product is carried by the pneumatic distribution system to the tillage. This device promotes a smooth flow of metered product as well as allowing the operator to adapt the pneumatic distribution system for varying configurations.

Although both of the above prior art devices disclose air seeders that allow for metered seeding or fertilizing, neither of the above devices disclose a device that is both able to selectively obstruct a portion of the meter, as well as lift the corresponding ground-engaging openers, thus, preventing double seeding and the destruction of the seed bed.

Consequently, there is a need for an air seeding system that can combine the closing of part of the meter or preventing supply of seed or fertilizer from part of the meter and preferably at the same time lifting the corresponding ground-engaging openers to which supply is closed to prevent overseeding or overfertilizing and also prevent and also prevent disturbance of any already-planted or already-fertilized areas.

SUMMARY OF THE INVENTION

The present invention overcomes the problems associated with the prior art air seeding systems and devices by providing a sectional meter shut-off apparatus capable of restricting flow of material such as seed or fertilizer to selected ground-engaging members of an agricultural implement.

In addition the present invention overcomes the problems associated with the prior art air seeding systems and devices by providing an agricultural implement which uses a metering device, which implement is capable of not only automatically avoiding over-seeding or over-fertilizing of previously seeded or fertilized areas, but further advantageously avoids disturbing already seeded or fertilized areas.

Still further, the invention further relates to a method of operating a seeder or fertilizer implement for automatically avoiding over-seeding or over-fertilizing of previously seeded or fertilized areas and further avoiding disturbing already seeded or fertilized areas.

Accordingly, in one broad aspect of the present invention, a metering device is provided, which in a preferred embodiment has a plurality of gates that can be individually operated to block off specific portions of a metering roller and thus seed and/or fertilizer will only be provided to selected ground-engaging members which will seed and/or fertilize previously unseeded or unfertilized soil. The plurality of metering gates are controlled by electric actuators, hydraulic actuators, electric over hydraulic actuators and/or by a camshaft. To control the individual metering gates a switch is operatively connected to the cab of the vehicle towing the seeding device, and means receptive to such switch are provided to control the various gates of the meter device. From the cab the driver can specifically select which gates should remain open and which gates should be closed. Alternatively, in an important preferred embodiment, the gates are individually automatically opened or closed by instructions from a GPS system which has determined which areas of a field have been previously seeded or fertilized.

The meter shut-off apparatus of the present invention in one embodiment thereof comprises a plurality of gates which, in one embodiment of the meter shut-off apparatus, are located above a metering roller, and which are capable of moving in forward or rearward positions for either blocking or allowing the flow of particulate material to the metering roller below. The meter shut-off device works with metering systems which regulate the flow of seed or fertilizer to seed/fertilizer knives (the ground engaging members) which ultimately deposit seed or fertilizer into the soil. The entire system is usually pulled behind a tractor or other vehicle, and is typically pneumatically powered, although other means such as hydraulic actuation or electrical (solenoid) actuation is contemplated.

The present invention further comprises an agricultural implement capable of dual material disbursement, further having means to raise ground-engaging openers thereon to prevent ground engagement, in combination with a metering device that is able to prevent flow to the inactivated (i.e. raised) ground-engaging members when other ground-engaging members are operating.

Specifically, in another broad aspect of the present invention, an agricultural implement is provided which incorporates the metered shut-off apparatus, and which further has means for raising opener arms to which material delivery has been stopped by the meter shut-off apparatus.

Accordingly, in a further broad aspect, the invention comprises an agricultural implement which comprises: a central frame, mounting arms attached to the frame, a corresponding number of ground or soil-engaging members (typically a first knife and a second knife) attached to the mounting arms, the first knife typically being the fertilizer delivering system, and the second knife typically being the seed delivering system, and a frame mounting member with pivot points for mounting the mounting arm to a hydraulic ram. The hydraulic ram is utilized to engage the mounting arm to_thus raise the ground-engaging members from the soil. A sectional meter shut-off apparatus is further provided, capable of shutting off flow of material which would otherwise be provided to ground-engaging members which have been raised and are no longer engaging soil.

Thus the agricultural implement in one embodiment thereof comprises a sectional meter shut-off apparatus, said sectional meter shut-off apparatus comprising:

a metering roller for metering a material such as seed or fertilizer being dispensed;

a plurality of meter gates;

said meter gates each moveable between an open and closed position relative to the metering roller such that when each of said gates is in said closed position said material is not able to access the metering roller and when each of said gates is in said open position said material is able to access the metering roller and be dispensed through a material dispersing assembly.

In a preferred embodiment of the invention, the agricultural implement comprises a plurality of ground-engaging members, and is adapted to dispense one or more different materials into soil via the ground-engaging members. The ground-engaging openers can be controlled by an operator in the cab through the use of a switch within the cab of a towing vehicle, to actuate individual ground-engaging openers to either lift the ground-engaging openers and lock them into place for transport and/or to prevent disturbance of a portion of a field which has already been seeded, and to lower the ground-engaging openers and allow them to engage the soil when seeding of the one or more materials in the soil is desired.

In another aspect of the present invention comprising an agricultural implement, the ground-engaging openers of the agricultural implement can be individually and automatically controlled by a GPS system which can determine areas that have been previously seeded or fertilized and actuate a lifting means to lift the openers away from the soil thus prevent the seed bed from being disturbed in areas that have already been seeded or fertilized. Further, the agricultural implement of the present invention can be coupled with the sectional meter shut-off apparatus as previously described, such that corresponding openers and metered gates are simultaneously actuated to prevent both seed/fertilizer from being released, and also prevent the ground-engaging opener from engaging the soil.

Accordingly, in a further preferred embodiment, the present invention comprises an agricultural implement for injecting material, namely seed, fertilizer, or seed and fertilizer, into soil, comprising:

a central frame;

a plurality of elongate mounting arms, mounted to said central frame, each adapted to be moved from a raised transport position to a lowered operating position;

soil engaging means mounted on each of said mounting arms, adapted to engage soil when each of said mounting arms is in said operating position;

material dispensing means on each of said mounting arms proximate said soil engaging means for dispensing said material into the soil;

further comprising:

material metering means in communication with said material dispensing means, adapted to regulate and meter said material to said material dispensing means;

means for preventing flow of said material to selected of said material dispensing means during operation of said implement, wherein said means for preventing flow of said material to selected of said material dispensing means relies on input from a GPS or GNSS satellite navigation system which provides input to said means for preventing flow upon detection of regions of soil which have been previously traversed by said agricultural implement and injected with said material; and means for automated raising to said raised position selected of said mounting arms for which said flow of material to said material dispensing means thereon has been prevented due to said GPS or GNSS satellite navigation system having determined regions of soil which have been previously traversed by said agricultural implement and injected with said material.

The invention further comprises a method of operating a seeder or fertilizer implement for automatically avoiding over-seeding or over-fertilizing of previously seeded or fertilized areas and further avoiding disturbing already seeded or fertilized areas, comprising the steps of:

(i) providing:

a central frame;

a plurality of elongate mounting arms, mounted to said central frame, having raising means operatively coupled to each to permit said mounting arms to be moved from a lowered operating position to a raised transport position;

soil-engaging means mounted on each of said mounting arms, adapted to engage soil when each of said mounting arms is in said operating position;

material dispensing means on each of said mounting arms proximate said soil engaging means for dispensing said seed or fertilizer to said soil-engaging means and thereafter into said soil;

material metering means in communication with said material dispensing means, adapted to regulate and meter said material to said material dispensing means;

a GPS or GNSS satellite navigation system which provides an indication upon detection of regions of soil which have been previously traversed by said agricultural implement and injected with said seed or fertilizer;

(ii) obtaining input from said GPS or GNSS satellite navigation system upon detection by said GPS or GNSS satellite navigation system of regions of soil about to be or being traversed by said implement which have been previously traversed by said implement and injected with said seed or fertilizer;

(iii) preventing, upon said detection by said GPS or GNSS system, flow of seed or fertilizer to selected material dispensing means which would otherwise dispense said seed or fertilizer into regions of soil which have previously been traversed and injected with said seed or fertilizer by said agricultural implement; and (iv) raising, via said raising means, selected mounting arms to which flow of said seed or fertilizer to material dispensing means thereon has been prevented, so as to prevent said soil-engaging means thereon from engaging said regions of soil which have been previously traversed by said agricultural implement and injected with said seed or fertilizer.

Further preferred embodiments and features of the invention are contained in the following descriptions of illustrative embodiments.

BRIEF DESCRIPTION OF THE DRAWINGS

The following illustrative and non-limited examples of the invention are shown in the attached figures, in which.

DETAILED DESCRIPTION OF THE EMBODIMENTS

Figure 1:
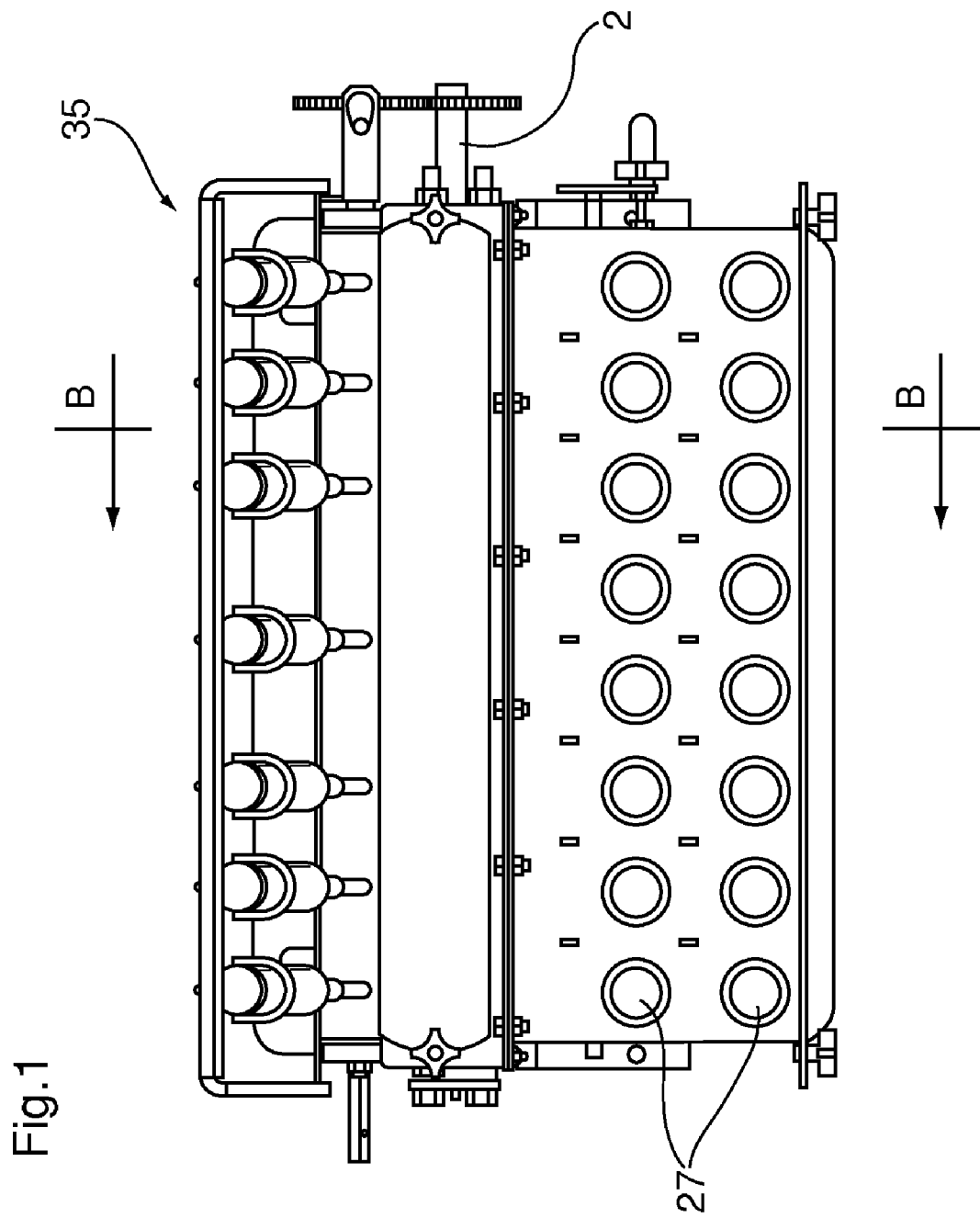
FIG. 1. is a front view of a meter shut-off apparatus as per one embodiment of the present invention.

The present invention, both as to its organization and manner of operation, may best be understood by reference to the following description and the drawings wherein numbers are used throughout several views to label like parts. Certain parts which are mentioned may be absent in particular figures due to the view of the drawing or obstruction by other parts.

A preferred embodiment of a sectional meter shut-off device/assembly 35 of the present invention is illustrated in FIGS. 1 to 8. The sectional meter shut-off device is comprised of a fluted or toothed metering roller 1 for ultimate distribution of particulate material to an agricultural implement. The metering roller 1 extends across the width of a metering assembly 35. The metering roller 1 can be made of a variety of materials and have a variety of fluted or toothed configurations to correspond to the various crops that may need seeding. Upon forward movement of an air seeding system 100 the metering roller 1 rotates on a drive shaft 2 which causes particulate material including seed and fertilizer to be dispensed from a supply source 5 having a seed tank 96 and a fertilizer tank 98 to dispense at a predetermined rate through outlets 27 in the fertilizer metering assembly 35a or seed metering assembly 35b and into distribution lines 37 (see FIG. 8) and ultimately dispensed by an air distribution system 15, 18 through a plurality of ground-engaging openers 3 (FIGS. 13 to 16) and into soil. FIGS. 1-7 illustrate outlets 27. In a field where a pie shape or long strips of land remain unseeded or unfertilized and/or are narrower than the width of the seeding/fertilizing machinery, it would be optimal to turn off part of the seeding/fertilizing machinery to only seed/fertilize those areas that have not been seeded/fertilized rather than over-seed/fertilize or double-seed/fertilize a particular area and disturb an underlying seed bed. To accomplish this, a plurality of gates 4 are installed above the metering roller 1 which are able to move in either forward or rearward directions. In the forward direction each gate 4 prevents particulate material from being dispensed to that particular section of the metering roller 1 and acts as a barrier preventing the particulate material from contacting the metering roller 1. In the rearward position the gate 4 allows the particulate material to access the metering roller 1. A plurality of these gates 4 occur along the axis 33 of the metering roller 1 such that the metering roller 1 can be divided into sections and individual gates 4 can be engaged to provide a different length of the air seeding system to be blocked for seeding or fertilizing purposes.

Figure 2:
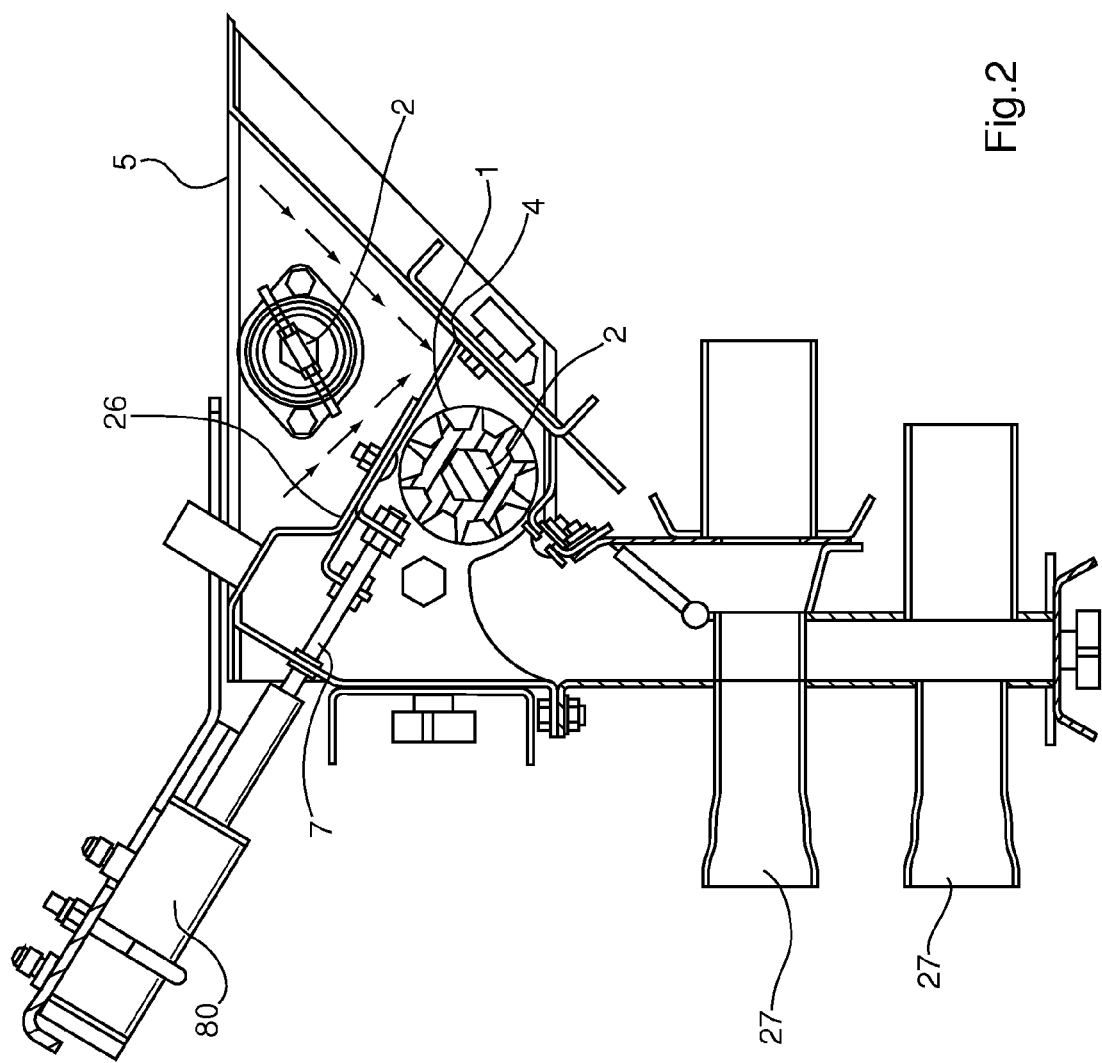
FIG. 2. is an enlarged cross-sectional view of the meter shut-off apparatus of FIG. 1, taken along line B-B of FIG. 1, showing the shut-off gates in the closed position.
Figure 3:
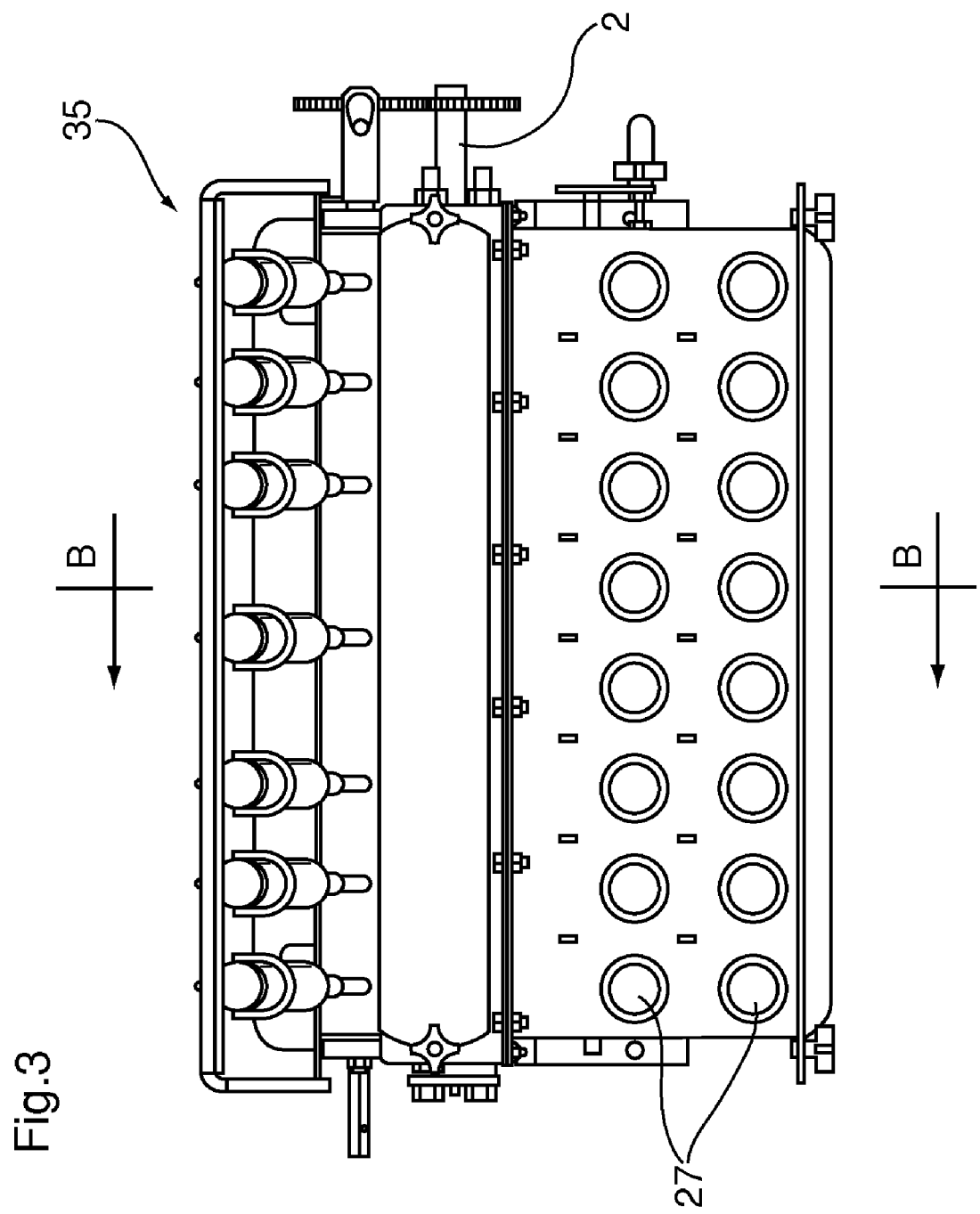
FIG. 3. is a front view of a meter shut-off apparatus of the present invention, similar to FIG. 1.
Figure 4:
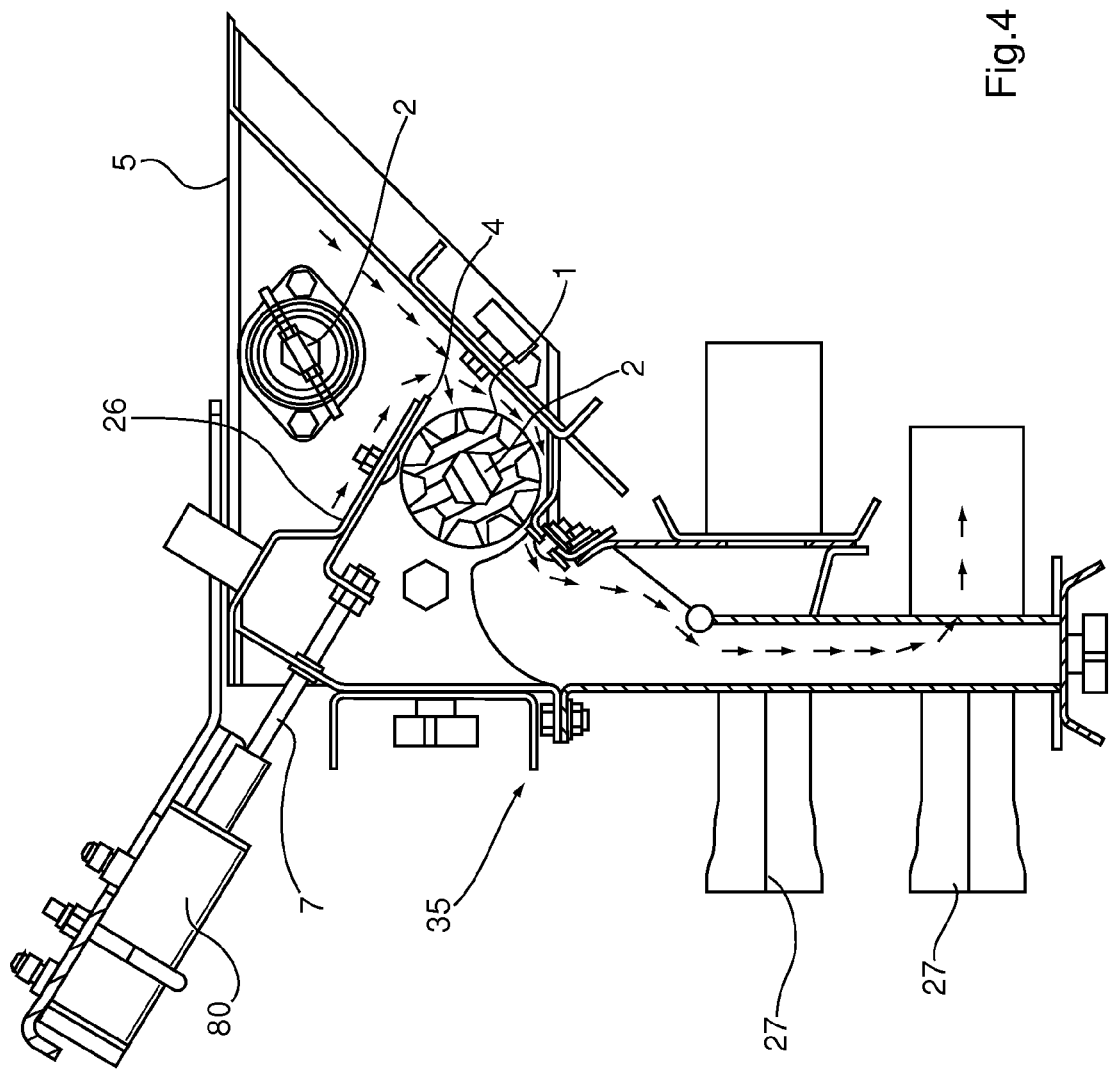
FIG. 4. is an enlarged cross-sectional view of the meter shut-off apparatus of FIG. 3, taken along line B-B thereof, showing the shut-off gates in the open position.

As seen in FIGS. 2 and 4, a gate 4 is threadably connected to a first end of a shaft 7 above the metering roller 1. The shaft 7 is slidably attached to the internal surface of the rear and upper corner of an air seeding system hopper 5. Further, a second end of the shaft 7 is attached to an electric actuator, a hydraulic cylinder actuator, or an electric over hydraulic meter gate actuator 80. Further, each gate 4 is slidably connected to a metal plate 26, the plate 26 being connected to the upper, rear portion of an air seeding system hopper 5 by a variety of means which may include but are not limited to welded, soldered or bolted. The metal plate 26 serves as a guide for the gate 4 such that the plate's position relative to the gate 4 correctly positions the gate 4 over the metering roller 1 when engaged by the shaft 7. Further, when engaged by the shaft 7, the gate 4 is brought forward to engage the opposite end of the air seeding system hopper 5 such that particulate material cannot pass between the gate and the air seeding system hopper 5. When not engaged by the shaft 7, the gate 4 remains in a fixed position slidably attached to the metal plate 26. In this position, particulates can pass between the gate 4 and the air seeding system hopper 5 and through to the metering roller 1 and then to distribution lines 37. From the distribution lines 37, the particulate material will ultimately pass to the ground-engaging openers 3 of an agricultural implement/air seeding apparatus 200 and into the soil.

Figure 5:
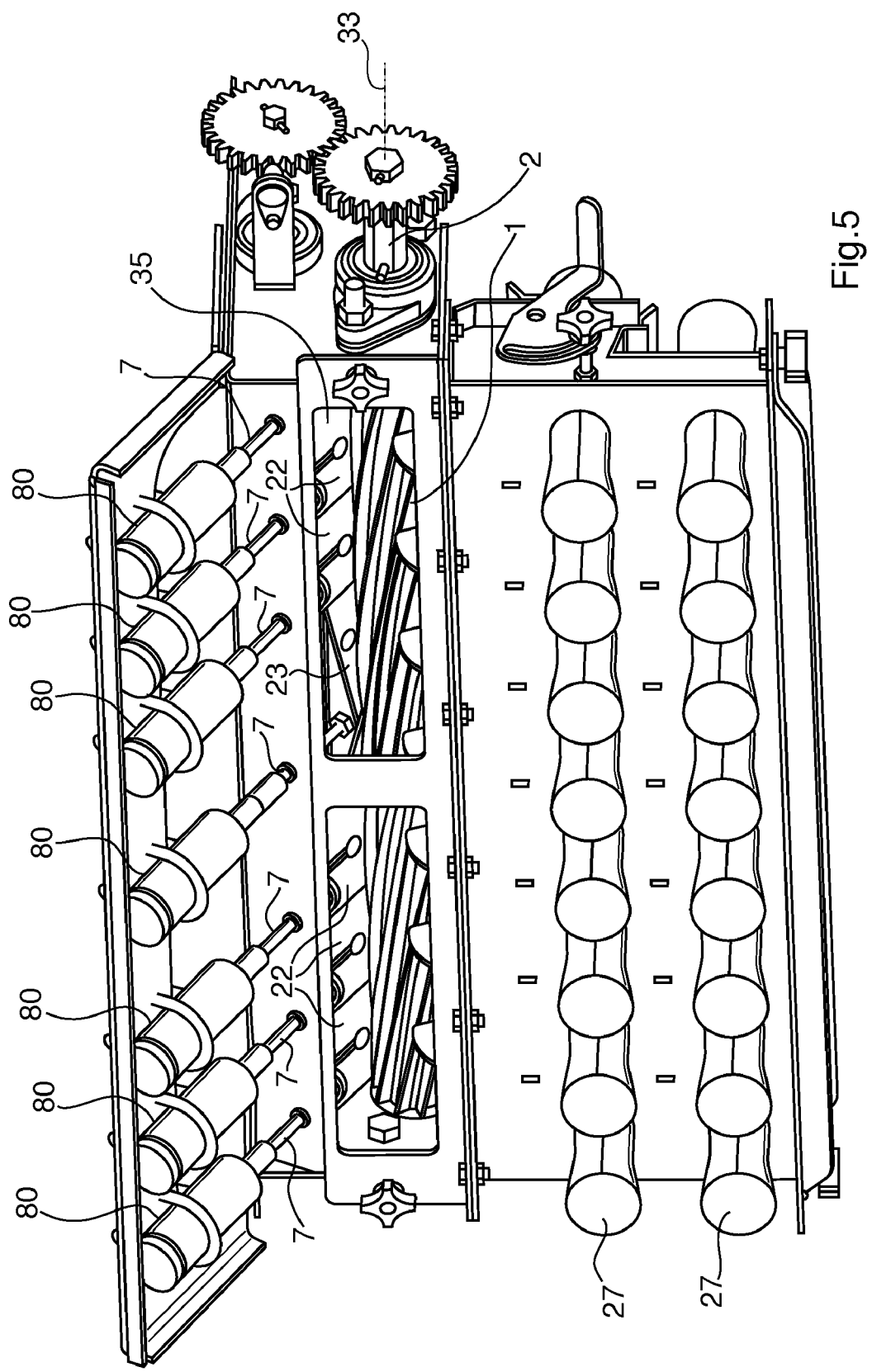
FIG. 5. is a bottom perspective view of the meter shut-off apparatus of the present invention, including the individual shut-off gates in both open and closed positions.
Figure 6:
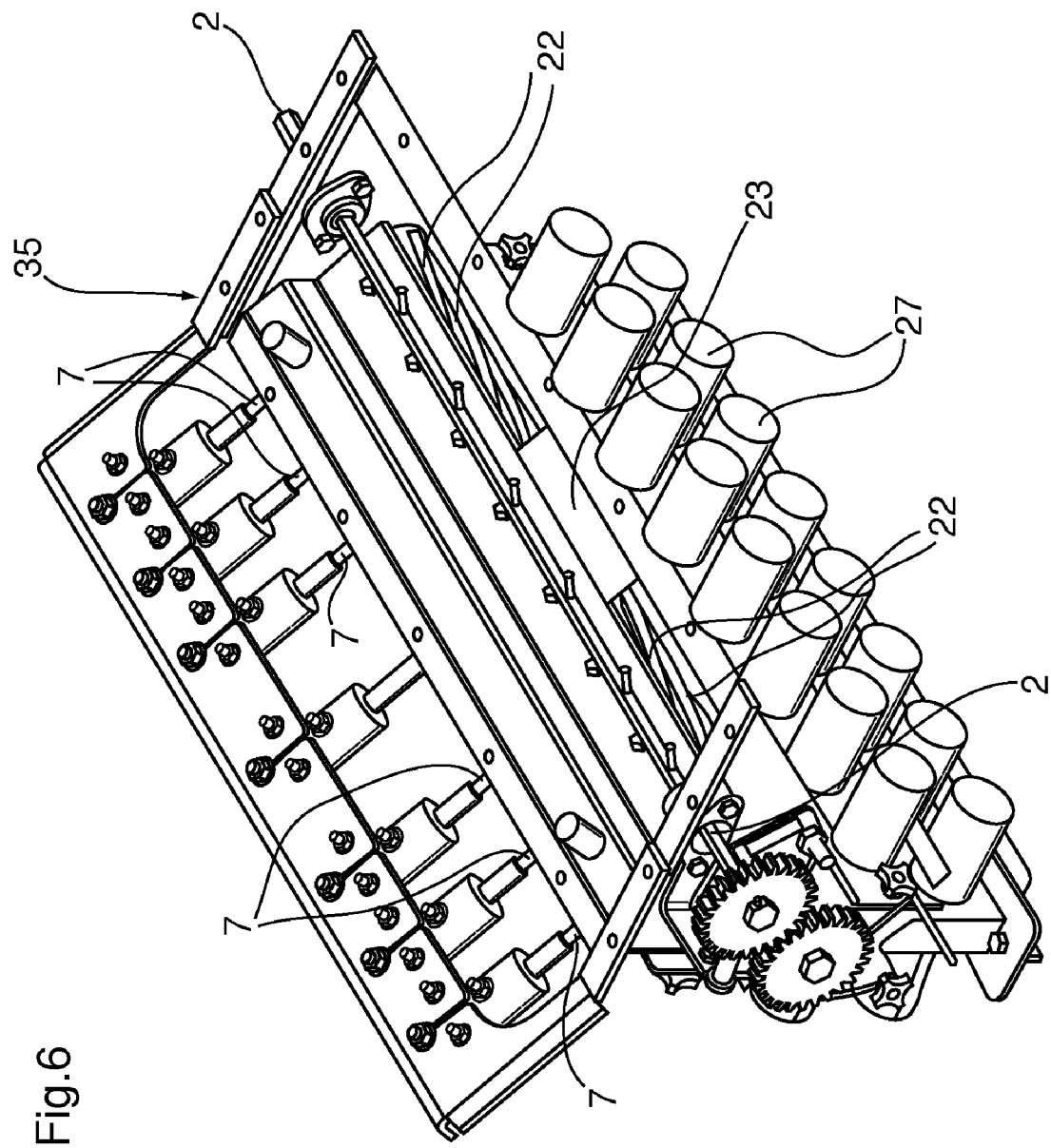
FIG. 6. is a top perspective view of the meter shut-off apparatus of the present invention, including the individual shut-off gates in both open and closed positions.
Figure 7:
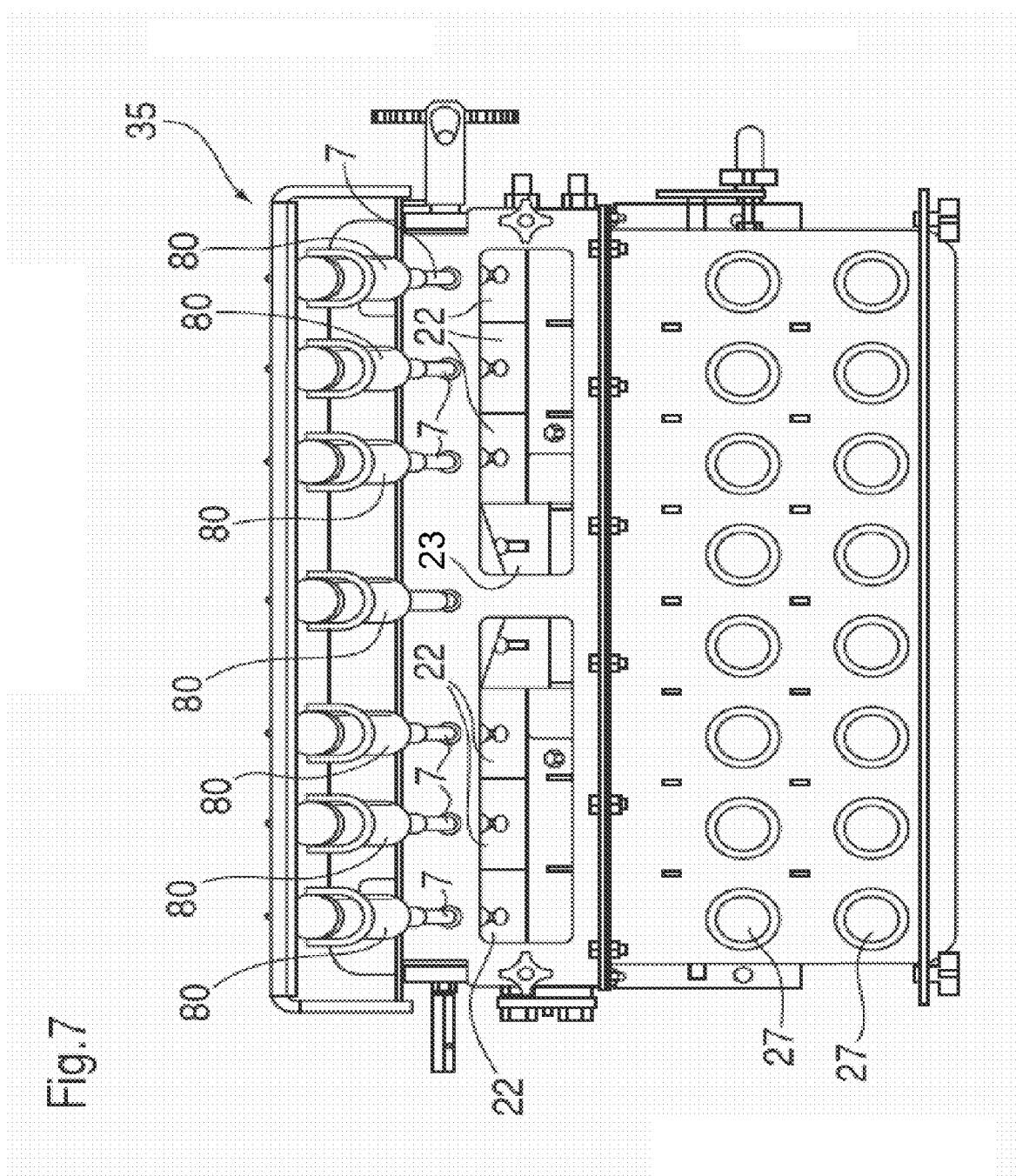
FIG. 7. is a front view of the meter shut-off apparatus of the present invention, showing gates in both opened and closed positions.
Figure 8:
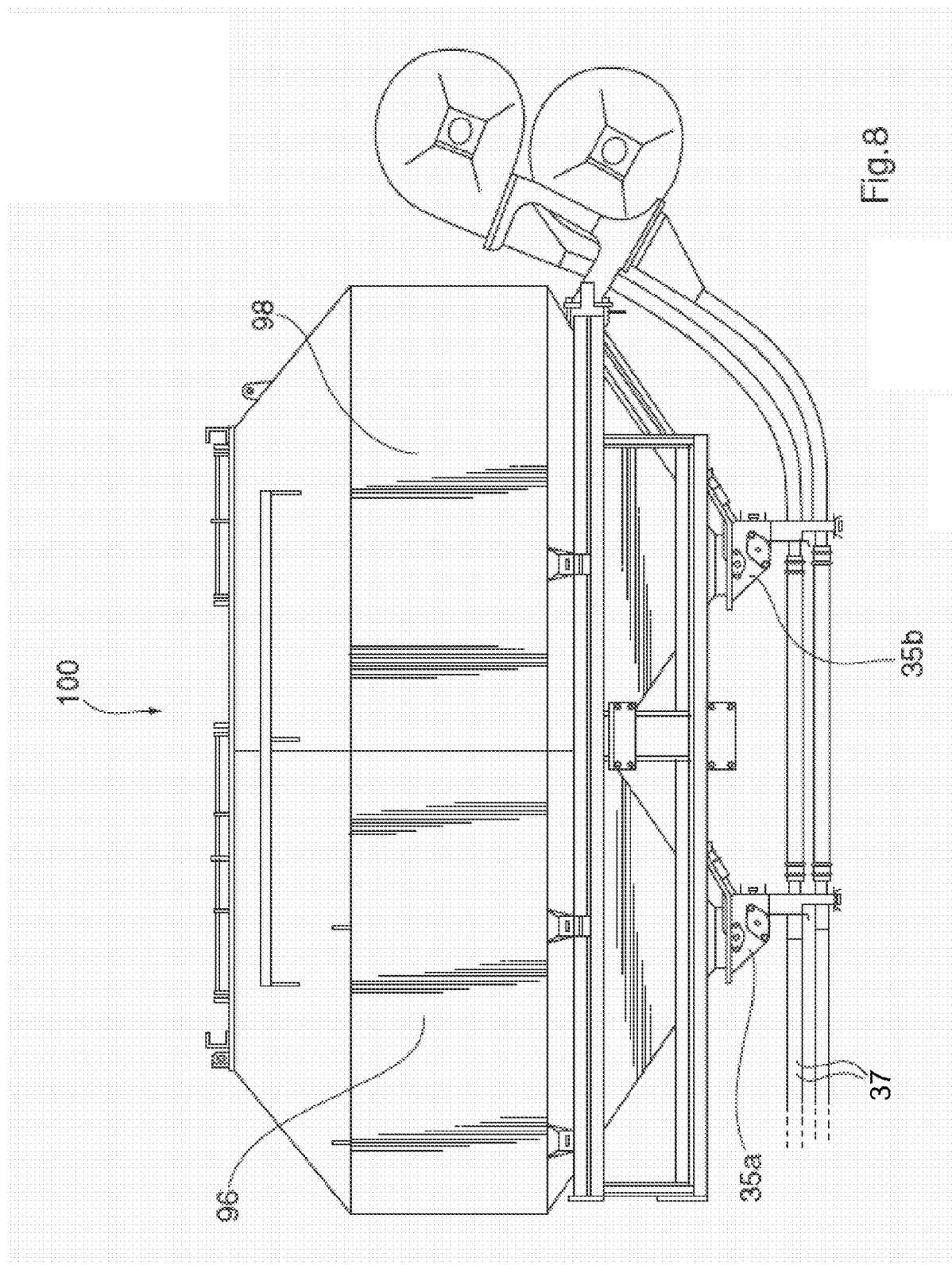
FIG. 8. is a side view of the air seeding apparatus of the present invention which supports a fertilizer tank and a seed tank showing the location of installation of the meter shut-off apparatus.

FIGS. 5 to 7 show the shaft 7 differently engaged to produce an open gate 22 or a closed gate 23 when activated. Each gate 4 is ideally made of steel or another suitably strong metal. When in the forward (closed) position, the gate 23 completely prevents the metering roller 1 from accessing any particulate matter released from above the metering roller 1. In FIG. 2 the gate 4 can be clearly seen in its closed position 23 blocking all access of the particulate material to the metering roller 1. In FIG. 4 and FIG. 6 the opened gates 22 can best be seen in which a free flow of particulate matter to the metering roller 1 can occur.

Figure 17:
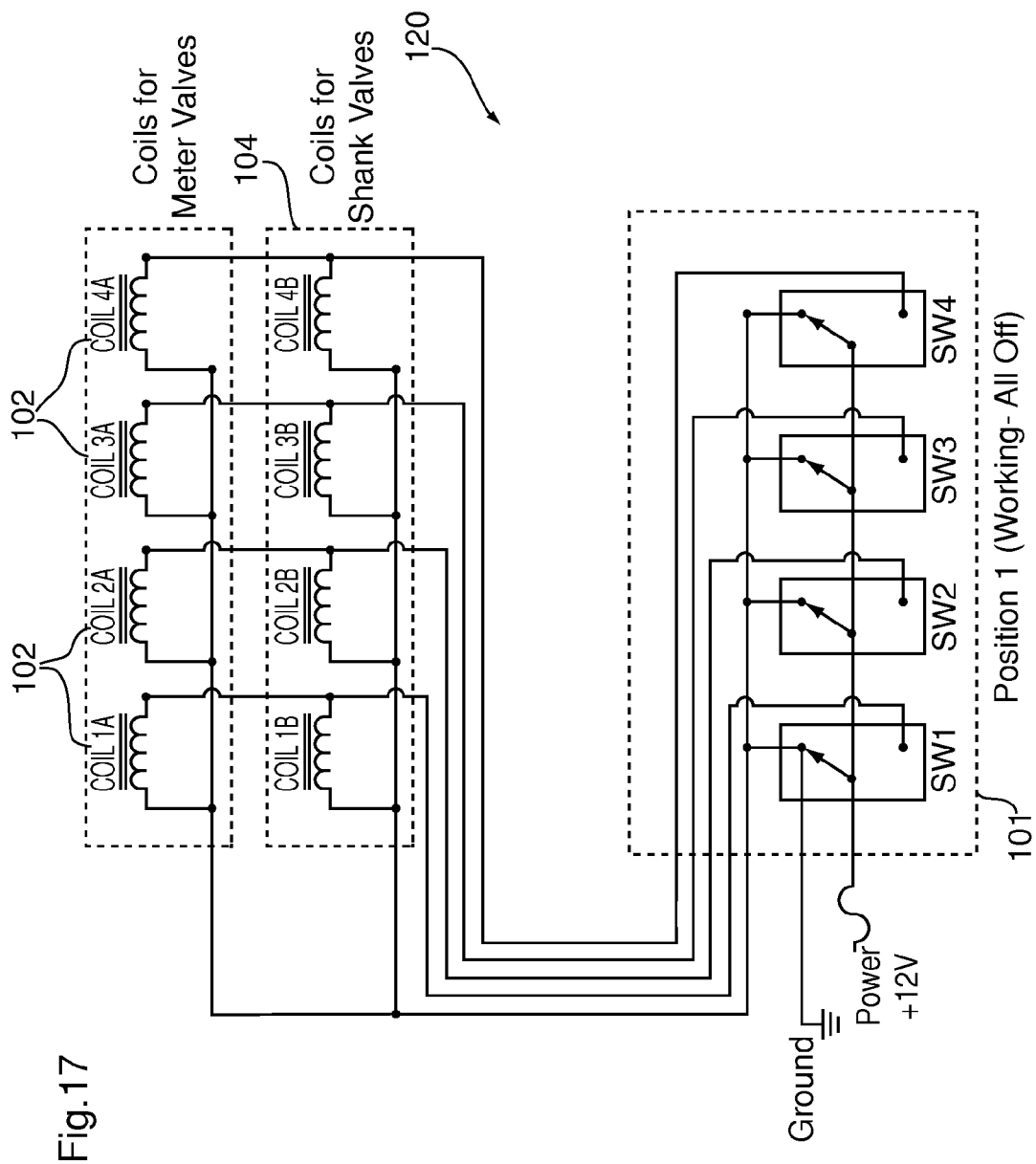
FIG. 17. is a schematic of an electrical circuit for operating the air seeding device of the present invention, showing all switches in the off position.
Figure 19:
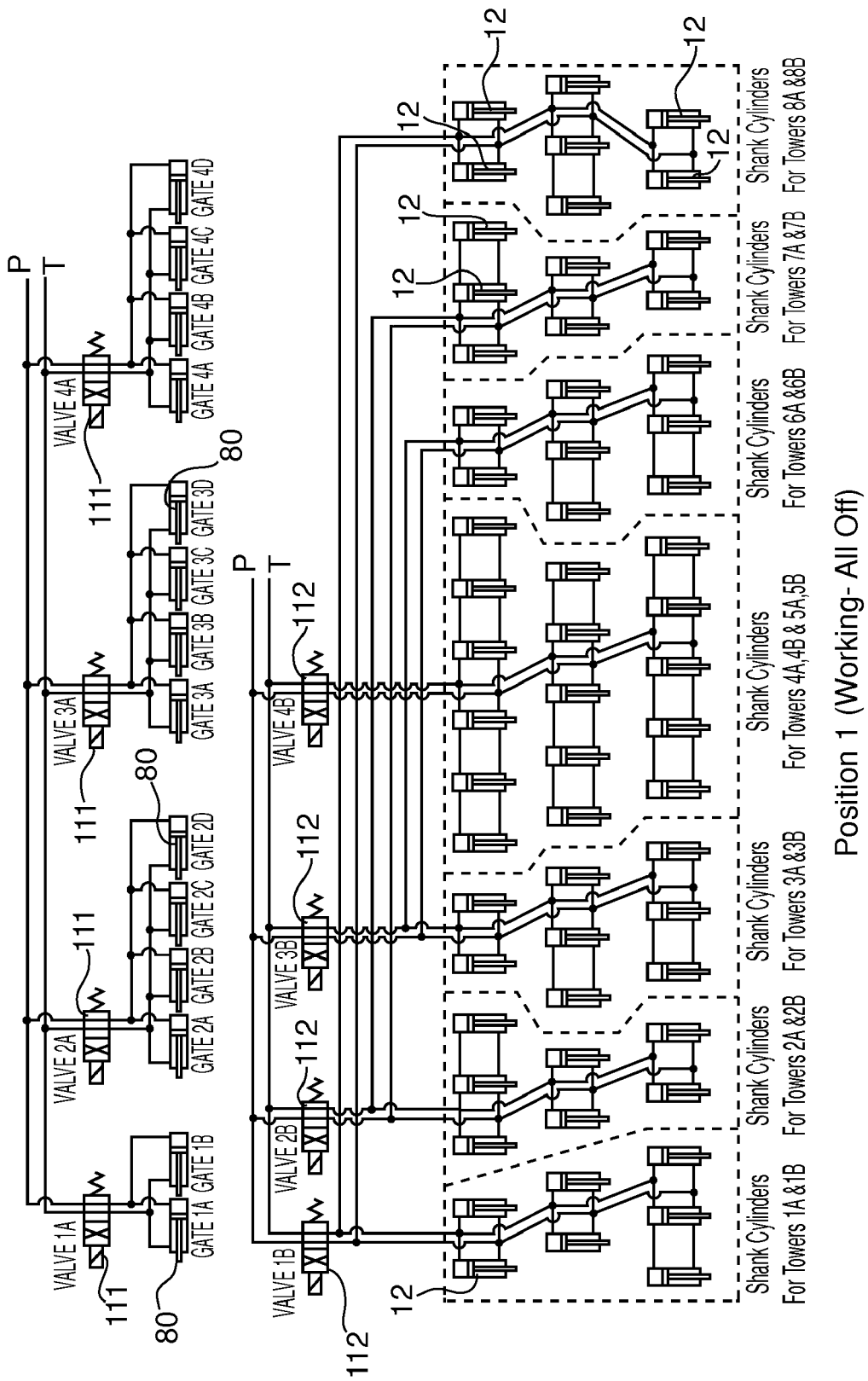
FIG. 19. is a schematic of a hydraulic circuit for operating the meter shut-off device of the present invention, showing all valves in the "off" position.

An electric switch 101 in the cab of the vehicle (not shown) pulling the air seeding apparatus 200 is connected operatively to an electric actuator, hydraulic actuator or electric over hydraulic actuator 80 which is operatively connected to the second end of the shaft 7 to allow the operator to operate the sectional meter shut-off apparatus 35 and more specifically designate which gates 4 are to be open and which gates 4 are to be closed based on the operators knowledge of which soil is to be seeded/fertilized and which is to remain undisturbed. FIG. 17 shows a schematic of the electrical circuit 120 for operating the air seeding apparatus 200 of the present invention, which includes a plurality of switches 101, for operating corresponding electrical coils 102 which respectively operate corresponding hydraulic valves 202 to control hydraulic cylinder actuator 80 and thus gates 4 on meter shut-off device 35 (see FIG. 19), and such switches 101 further operate coils 104, which correspondingly control hydraulic valves 112 for controlling hydraulic cylinders 12 for raising and lowering respective opener arm assemblies 202 from engagement with soil.

Figure 18:
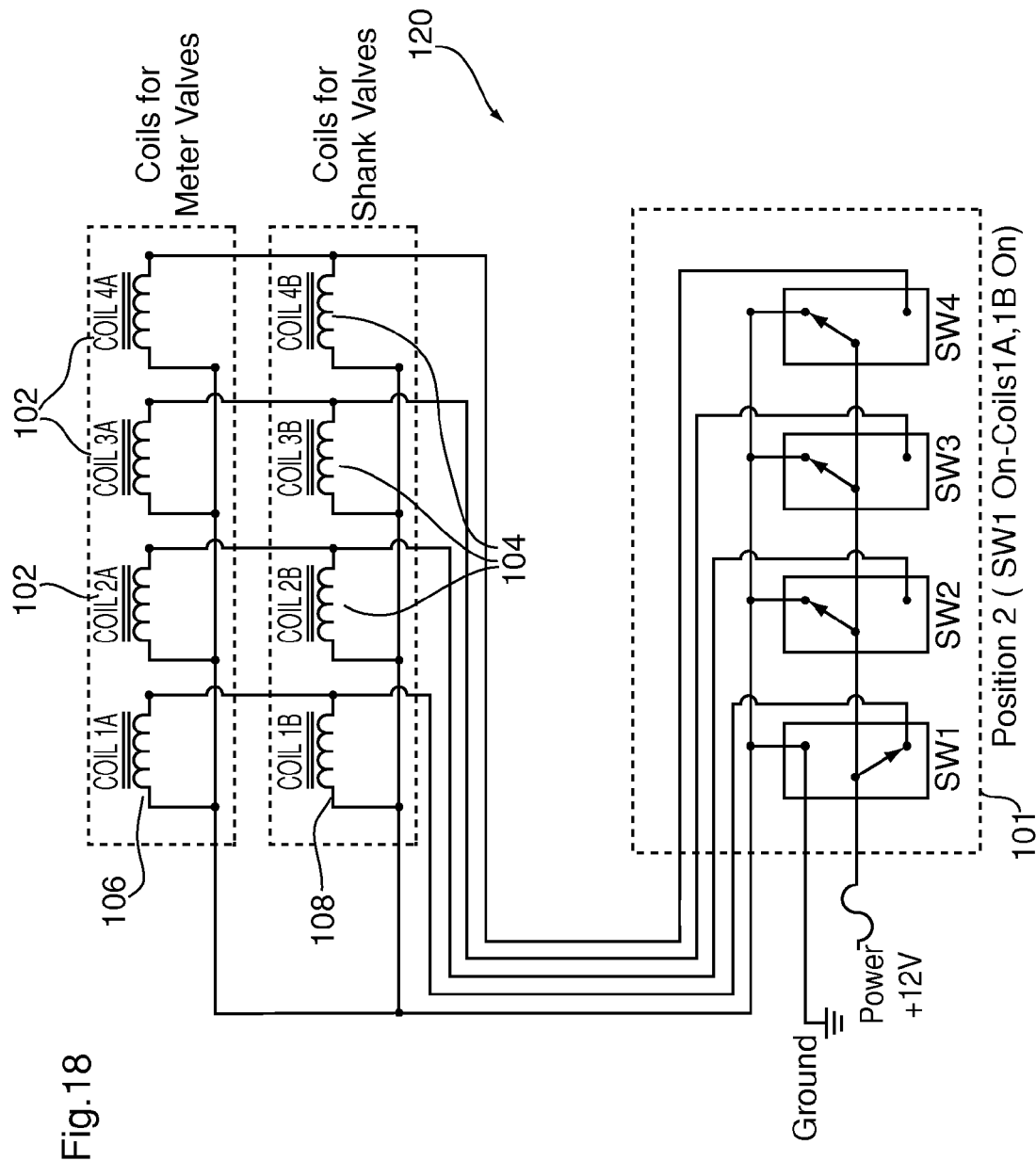
FIG. 18. is a schematic of the electrical circuit of the meter shut-off device of the present invention, showing switch 1 in the on position.

FIG. 18 is an electrical schematic similar to FIG. 17, both figures showing an electrical circuit 120 for operating air seeding apparatus 200 of the present invention, which includes a plurality of switches 101 for operating corresponding electrical coils 102. Electrical coils 102 respectively operate corresponding hydraulic valves 111 to control gates 4 on meter shut-off device 35 (see FIGS. 19 & 20).

Switches 101 of FIGS. 17 & 18 further and simultaneously operate coils 104 which correspondingly control hydraulic valves 112 for controlling hydraulic cylinders 12 for raising and lowering respective opener arm assemblies 202 from engagement with soil.

Figure 20:
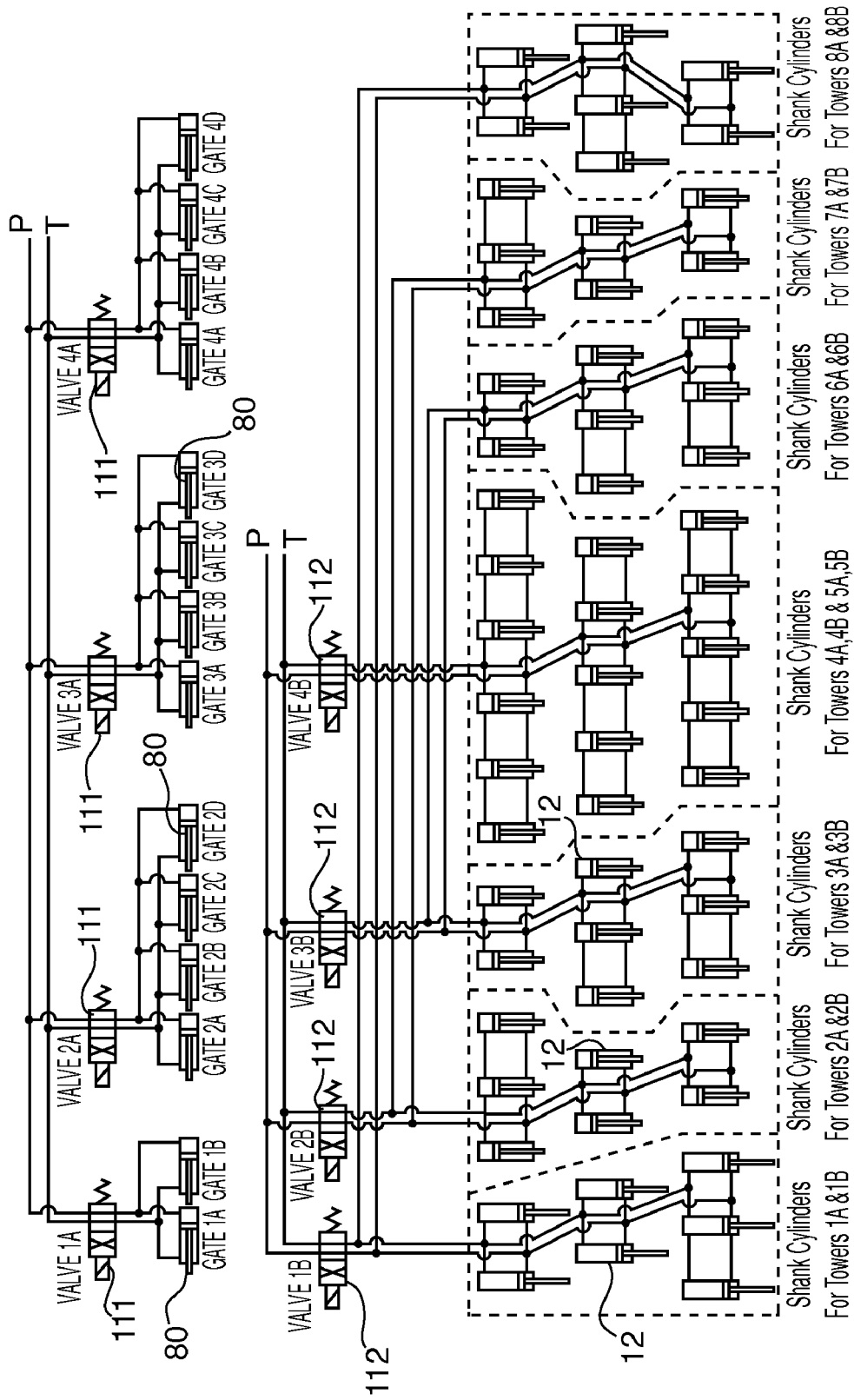
FIG. 20. is a schematic of a hydraulic circuit for the meter shut-off device of the present invention, showing valves 1A and 1B in the "on" position and remaining valves in the "off" position.

In this regard, FIG. 20 shows shank hydraulic cylinders 12 for groups of opener arm assemblies 202 (see "towers" 1A & 1B) in actuated position so as to cause associated opener assemblies 202 to be in the raised position. Remaining hydraulic cylinders 12 for remaining shank towers 2A, 3A, 4A, 5A, 6A, 7A & 8A, and 2B, 3B, 4B, 5B, 6B, 7B, and 8B are shown in the position to effect lowering of associated opener arm assemblies 202.

In the electrical circuit 120 shown in FIG. 17, all switches 101 (eg. sw1-4) are shown in the "off" position. This causes associated hydraulic valves 112 to open and thereby cause corresponding hydraulic actuators 80 which control the metering gates 4 of the meter shut-off devices 35a, 35b to actuate the gates 4 to be in the "closed" position, and correspondingly control hydraulic valves 112 to cause hydraulic cylinders 12 to lower the opener arm assemblies 202 to engage soil (See FIG. 19, and FIG. 16).

Figure 15:
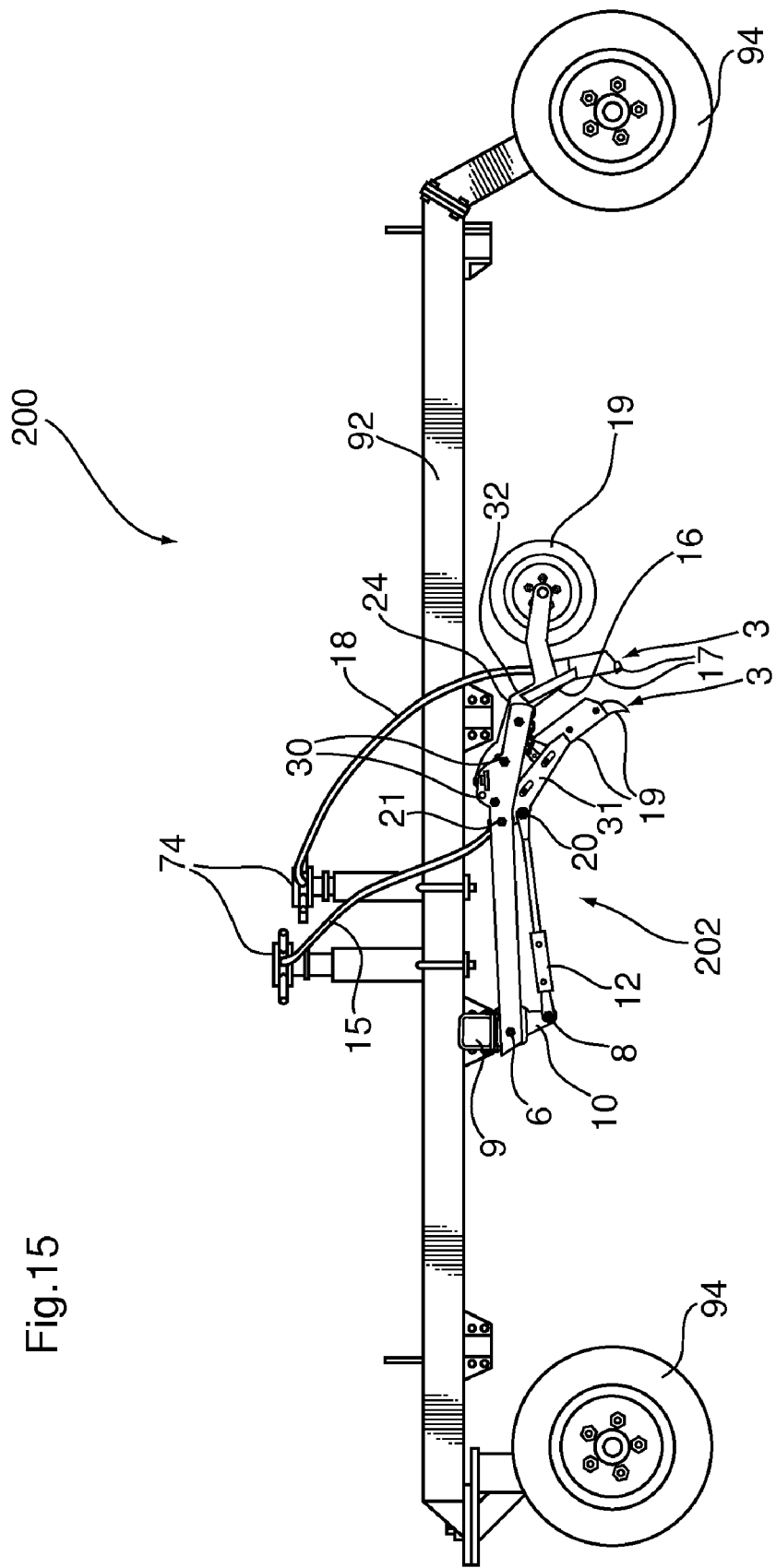
FIG. 15. is a cross-sectional side view of the agricultural implement of the present invention, with the soil openers in the raised position and pivotally mounted to a conventional frame.

In the electrical circuit 120 shown in FIG. 18, sw1 is shown in the "on" position and the remaining switches sw 2-4 are shown in the "off" position. As seen from FIGS. 18 and 20, due to sw1 being in the "on" position, corresponding coil 102 (coil 1A) activates meter shut-off valve 111 which correspondingly activates meter gate hydraulic actuator 80, so as to close meter gate 4. Simultaneously, switch 101 (sw) activates coil 108 (coil 1B), so as to activate hydraulic valves 112 (see FIG. 20) (valve 1B), which in turn operates hydraulic shank cylinders 12 for opener arm assembly 202 (shank cylinders 1A, 1B), so as to cause hydraulic shank cylinders 12 to raise opener arm assembly 202 to the raised position, as shown in FIG. 15 and in position 91 on FIG. 12.

Figure 9:
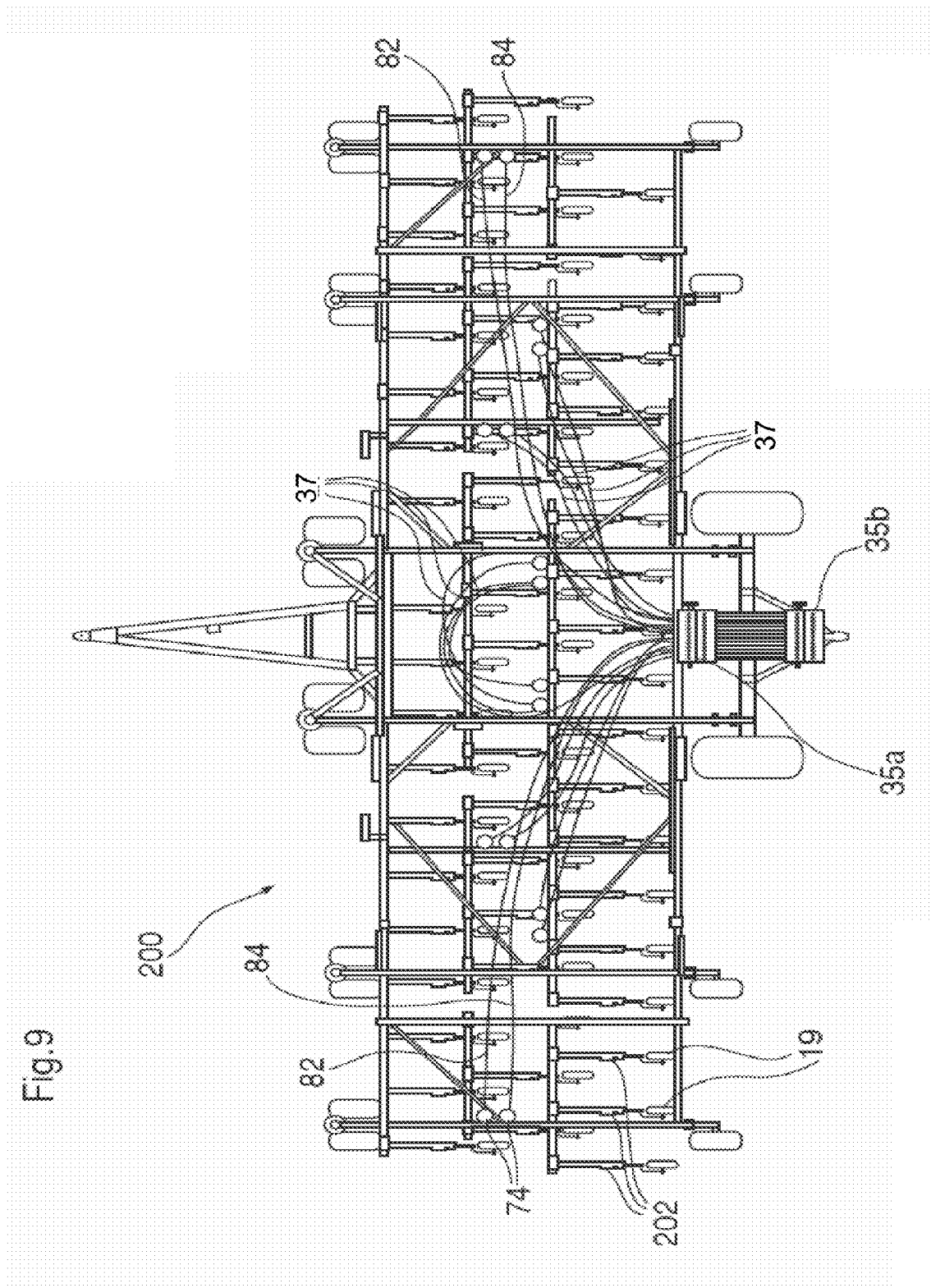
FIG. 9. is a top plan view of an air seeding apparatus of the present invention depicting distribution lines that are open to the flow of fertilizer from the meter shut-off apparatus.
Figure 10:
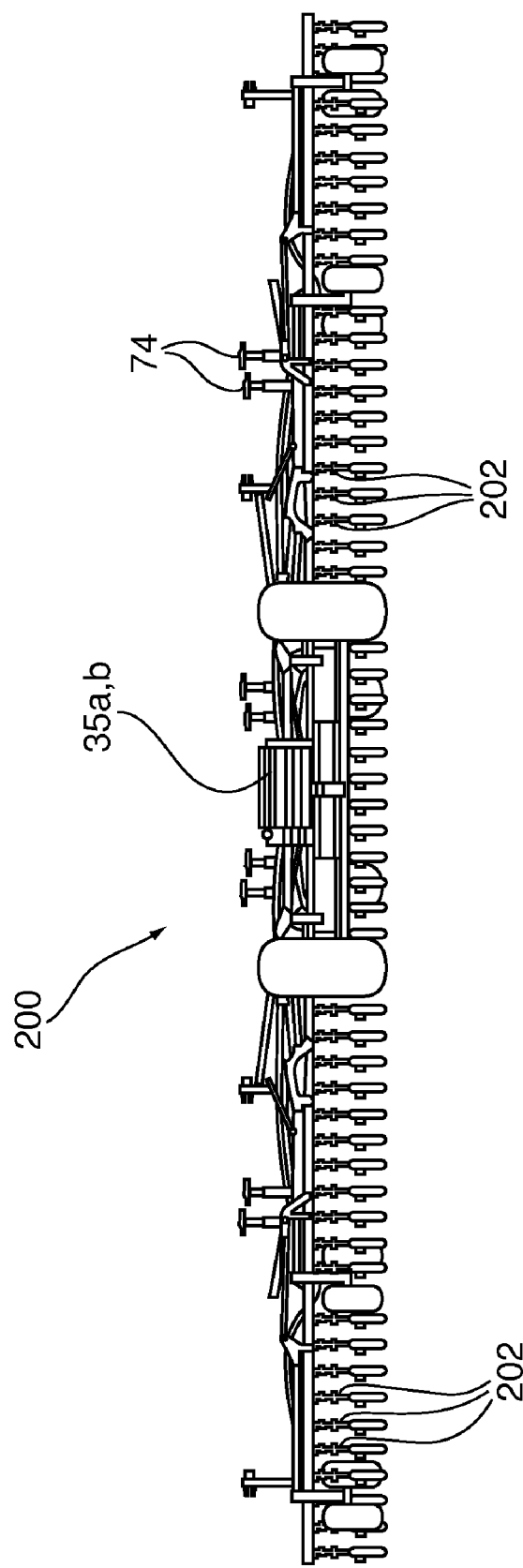
FIG. 10. is a front view of an air seeding apparatus of the present invention depicting the soil openers in the lowered position.

FIGS. 8 to 12 shows an agricultural apparatus equipped with a seed meter 35a and a fertilizer meter 35b. From each meter 35a, 35b, a plurality of distribution lines 37 are coupled such that an individual gate 4 within a meter 35a, 35b will correspond to an individual distribution line 37. Each distribution line is also coupled at its other end to a secondary distribution head 74. Each agricultural apparatus 200 has a plurality of secondary distribution heads 74. Each secondary distribution head 74 has a plurality of couplings to seed hoses 82 or fertilizer hoses 84. Each secondary distribution head 74 is then coupled at its other end to respective seed tube/hose 18 and fertilizer hose/tube 15 (see FIG. 9). Because the secondary distribution head 74 has a plurality of couplings to seed tube/hoses 18 or fertilizer tube/hoses 15, each gate 4 of meter shut-off 35a, b can selectively open or close the supply of seed or fertilizer to a respective plurality of seed hoses 18 (in the case of a seed meter shut-off device 35a) and to a plurality of fertilizer tube/hoses 15 (in the case of a fertilizer meter shut-off 35b). In FIG. 9 all of the distribution lines (white) depict seed and fertilizer hoses 82, 84 respectively open to the flow of fertilizer by a plurality of gates 4 in the seed meter 35a, and fertilizer meter 35b, respectively. Accordingly, in FIG. 10, all of the agricultural implements 200 are in the lowered position to allow the soil to be fertilized.

Figure 11:
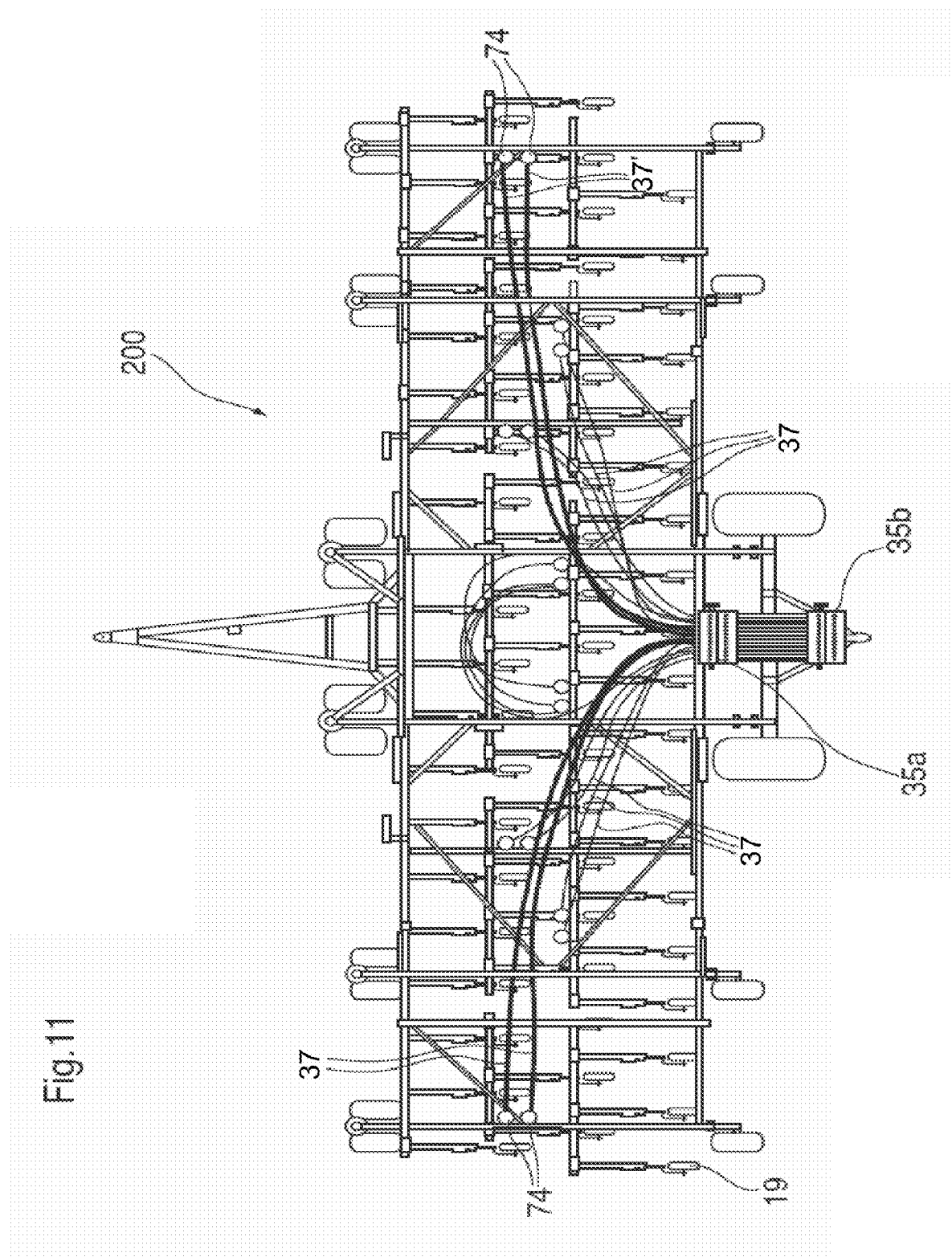
FIG. 11. is a top plan view of an air seeding apparatus of the present invention, depicting distribution lines that are either open (white) or shut-off (black) to the flow of fertilizer and seed from the meter shut-off device.

The black distribution lines in FIG. 11 depict seed hoses 82 and fertilizer hoses 84 shut-off to the flow of fertilizer by a plurality of gates 4 in the respective meter 35a,b, and the white distribution lines depict seed hoses 82 and fertilizer hoses 84 open to the flow of seed and fertilizer by a plurality of gates 4 in the respective seed and fertilizer meters 35a, b. As such, a plurality of opener arm assemblies 202 will have seed and fertilizer distributed to them and a plurality of opener arm assemblies 202 will not have fertilizer or seed distributed to them.

Figure 12:
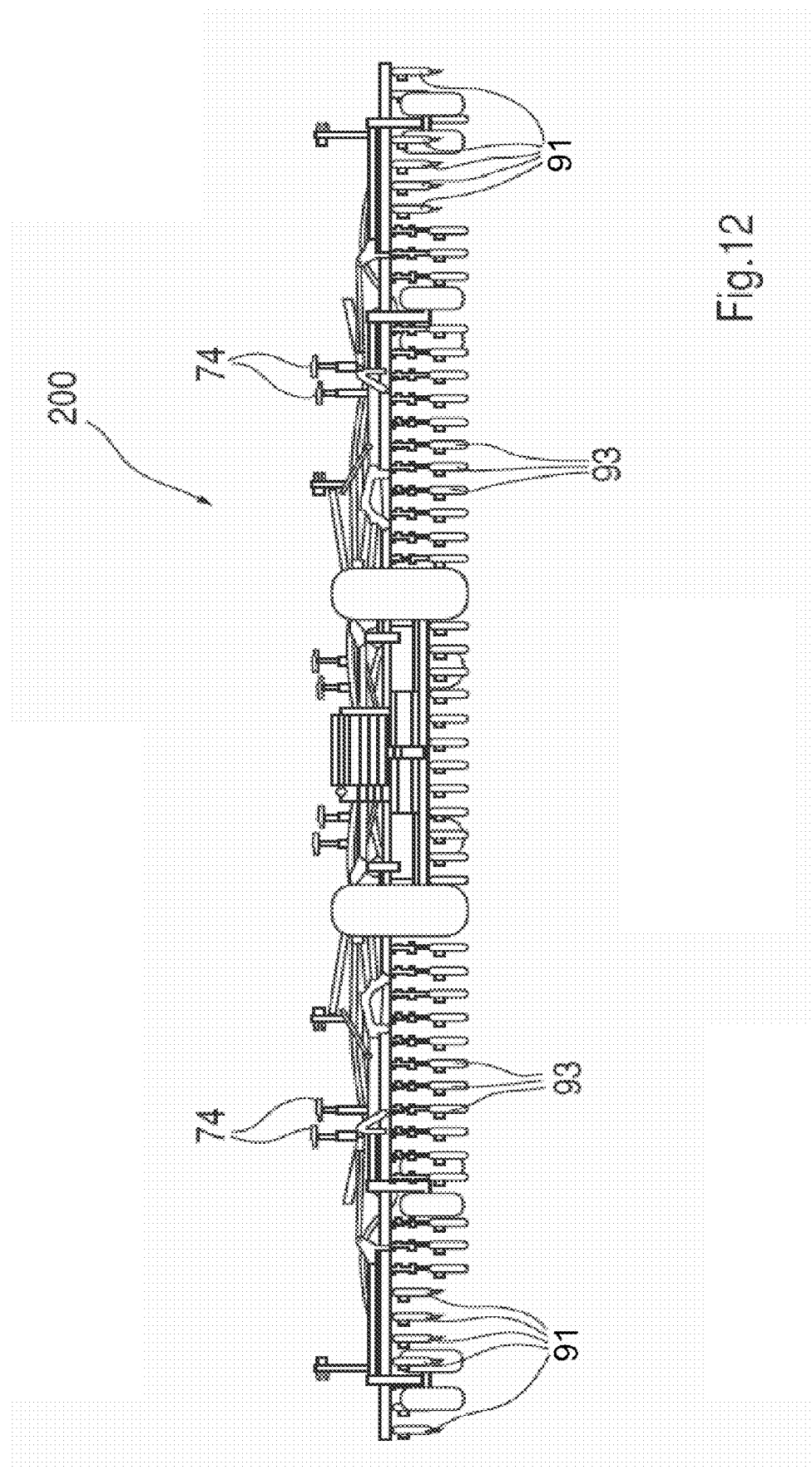
FIG. 12. is a front plan view of an air seeding apparatus depicting the soil openers in both lowered and raised positions.
Figure 13:
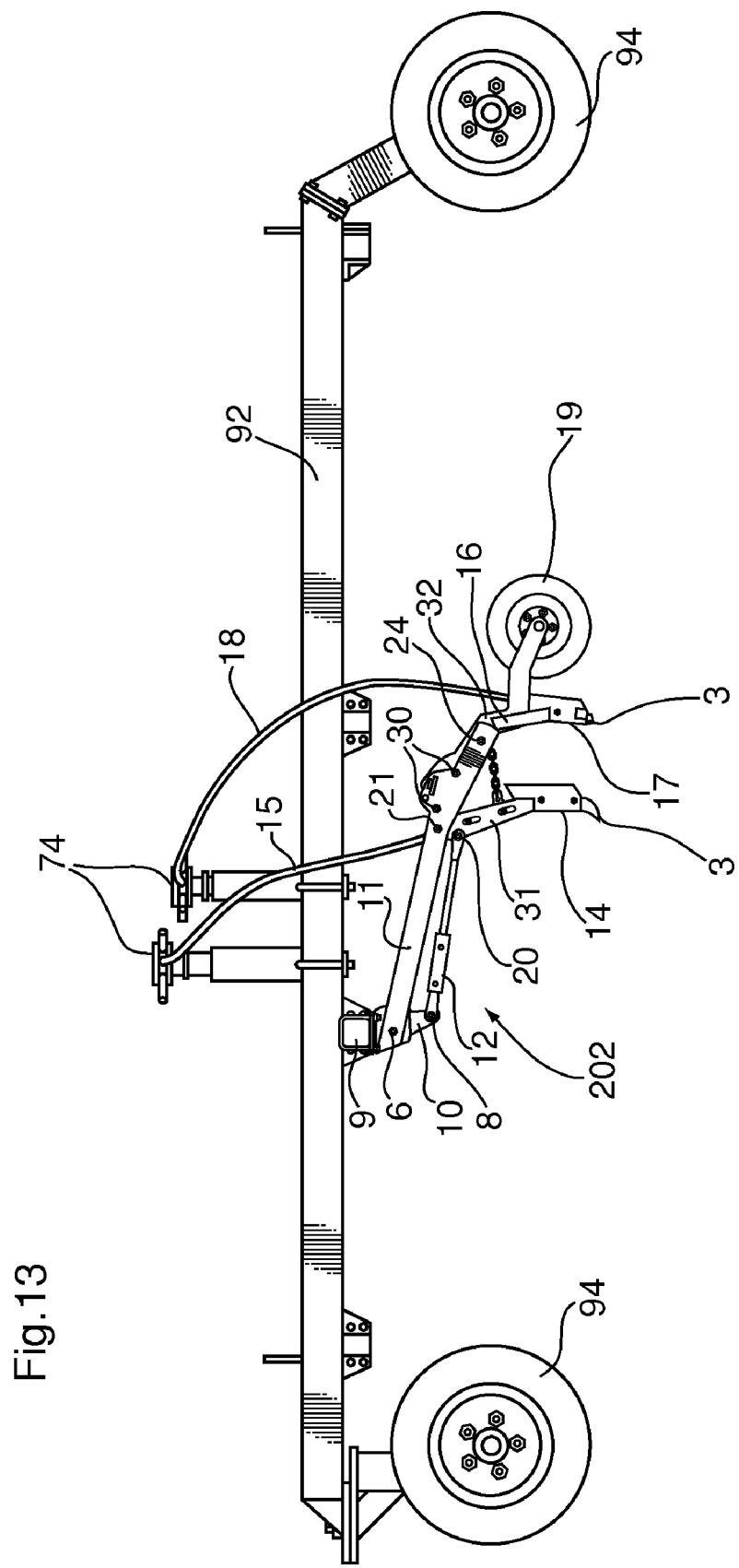
FIG. 13. is a cross-sectional side view of the agricultural implement of the present invention, showing the soil openers in the lowered position and pivotally mounted to a conventional frame.
Figure 14:
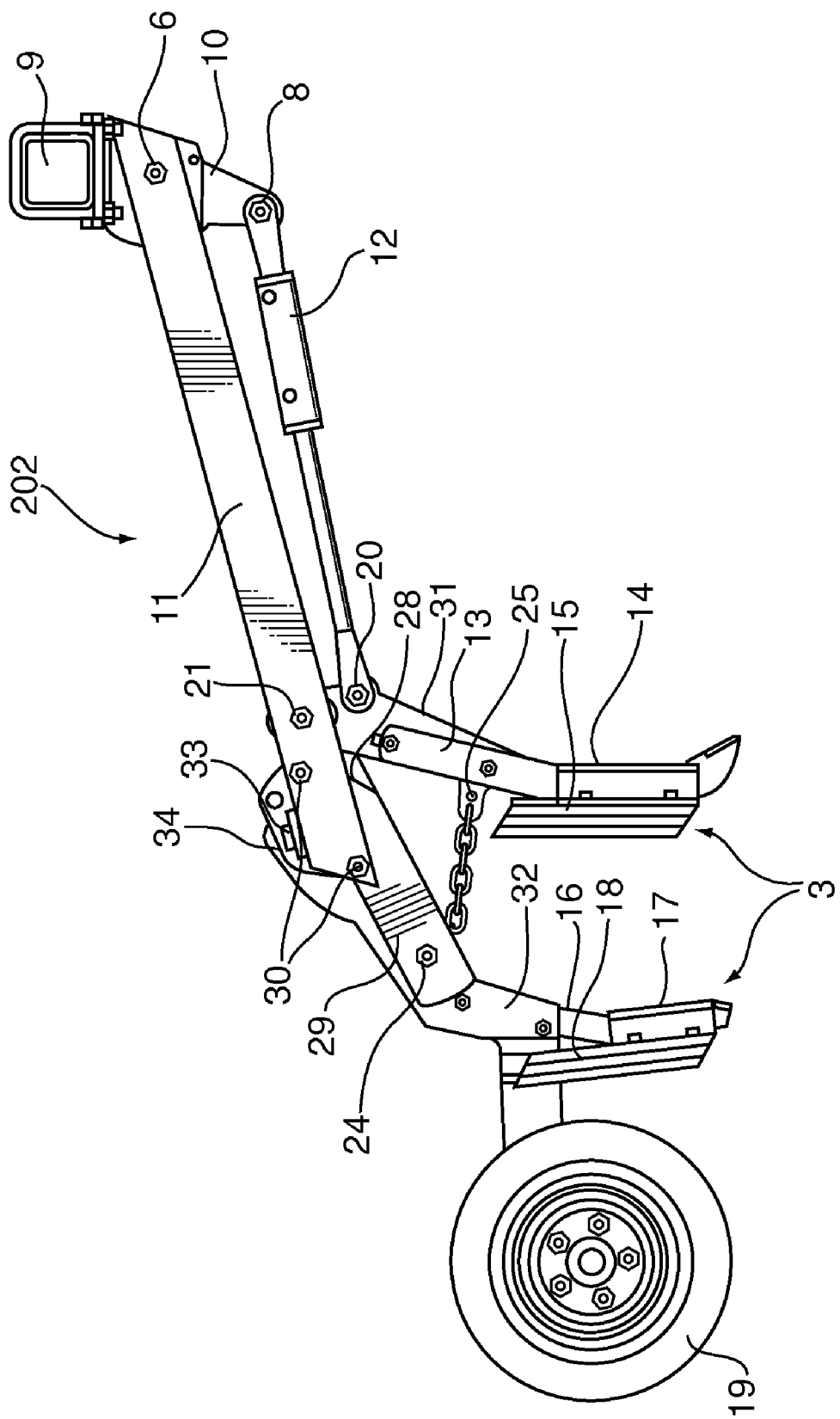
FIG. 14. is a cross-sectional side view of the agricultural implement of the present invention, with the soil openers in the lowered position.

FIG. 12 depicts a group of opener arm assemblies 202 in the raised position 91 so that they do not disturb the soil. Fertilizer hoses 84 and associated fertilizer tubes/hoses 15, and likewise seed hoses 82 and corresponding seed hoses/tubes 18, all associated with the opener arm assemblies 202 which are in the raised position 91, are closed to the flow of seed/fertilizer. Other opener arm assemblies 202 are shown in the lowered position 93, and the associated fertilizer tubes/hoses 15 and seed tube/hoses 18 are provided with fertilizer and seed to permit operation of the remaining operable opener arm assemblies 202 shown in lowered position 93.

Further, in another embodiment a GPS (Global Positioning System) or GNSS (Global Navigation Satellite System) guided system (not shown) is employed to automatically engage the electric actuator, hydraulic actuator, or electric over hydraulic cylinder actuator 80 and shaft 7 to close or open the gates 4 into an open or closed position, based on previous data determining where the seed or fertilizer has been previously deposited in the soil, to ensure that double seeding/fertilizing or over seeding/fertilizer does not occur.

Figure 16:
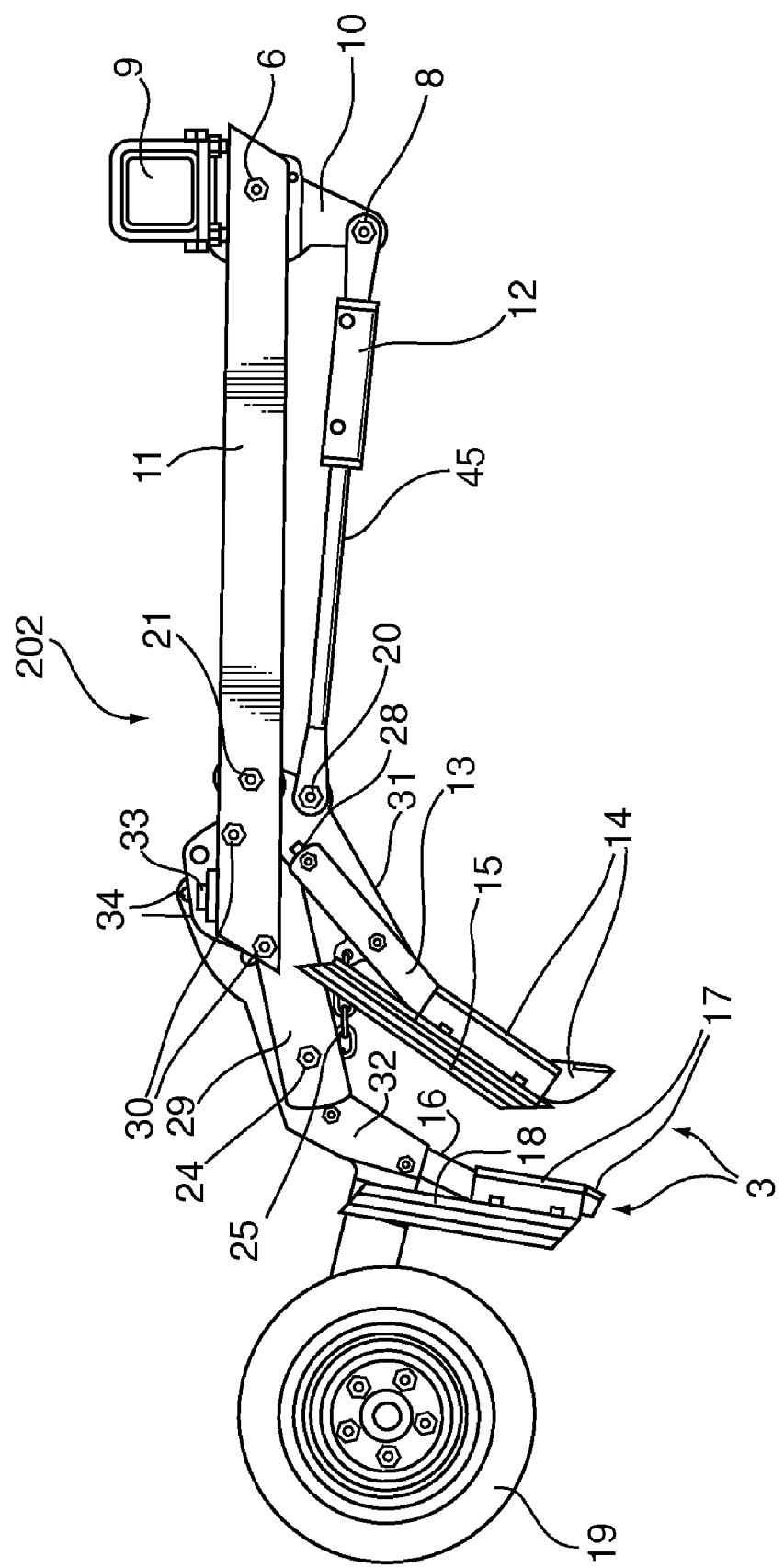
FIG. 16. is a cross-sectional side view of the agricultural implement of the present invention, with the soil openers in the raised position.

In a preferred but non-limiting embodiment, as seen in FIGS. 13 to 16 an agricultural implement 200 consists of an opener arm 11 pivotally mounted at pivot joint 6 to a cross-member 9 which is fixedly mounted to a conventional frame 92. The conventional frame 92 is operatively connected to a plurality of ground-engaging wheels 94. The opener arm mounting bracket 10 is fixedly mounted via cross-member 9 to conventional frame 92. Hydraulically extendable arm 45, containing a biasing hydraulic ram 12, is pivotably coupled at one end 8 thereof to opener arm mounting bracket 10, at another end 20 to seed opener arm 31, such that the biasing hydraulic ram 12 rests substantially parallel and below the opener arm 11, as shown in FIG. 16. First mounting member 31 is pivotably connected to opener arm 11 at pivotal joint 21, such that mounting member 31 is below and roughly perpendicular in the operating (soil engaging) position to opener arm 11. Hydraulic ram 12 may be extended to cause mounting member 31 to pivot rearwardly, and upon being so pivoted to contact opener arm 11, to cause opener arm 11 to pivot about pivot joint 6 so as to become raised, thereby raising the opener arm 11, packer wheel 19, first mounting member 31 (hereinafter collectively the opener arm assembly 202) from engagement with the ground.

First mounting bracket 31 is fixedly connected to the first delivery system mounting member 13. The first delivery system mounting member 13 contains the first cutting knife 14 as well as the first product (eg fertilizer) delivery hose/tube 15 (usually for delivering fertilizer) behind the first cutting knife 14. Distal to the first delivery system mounting member 13 is a second delivery system mounting member 16 connected below and to a second mounting member 32. The second mounting member 32 is fixedly connected at point 24 to a mounting arm extension 29. A pin 33 and plurality of bolts 34 also adjustably connects the second mounting member 32 to opener arm 11. The pin and plurality of holes allow for vertical adjustment of the second delivery system mounting member 16. The second delivery system mounting member 16 is generally perpendicular to opener arm 11. The mounting arm extension 29 is rigidly connected to the opener arm 11 with two fixed bolts 30. The second delivery system contains a second cutting knife 17 as well as a second product (eg seed) delivery tube/hose 18 (usually for delivering seed) behind the second cutting knife 17. Both first and second delivery system members 13, 16 respectively, are collectively referred to as ground-engaging openers 3. A linked chain 25 connects the first and second ground-engaging openers 3 and limits the forward movement of the first ground-engaging opener.

A ground-engaging packer wheel 19 is connected to the distal end of the second mounting bracket 32. The packer wheel 19 follows the two delivery system mounting members 13, 16 and allows for packing of soil above the material which has been inserted in furrows created in the soil. The biasing hydraulic ram 12 is pivotally connected to both the frame mounting member 10 as well as the first mounting bracket 31 to be able to engage the first delivery system mounting member 13. When the hydraulic ram 12 is extended, the upper edge of the first delivery system mounting member 13 engages the front edge 28 of the mounting arm extension 29. The mounting arm extension 29 is then raised, thus raising the attached second delivery system mounting member 16, second pivot bracket 32 and packer wheel 19. The front edge 28 of the mounting arm extension 29 is sufficiently thick to support the weight of the second delivery system mounting member 16 as well as the second pivot bracket 32 and wheel 19 in a raised position for transport purposes. Reversing the hydraulic ram 12 by activating hydraulic shank valves 212 causes the corresponding opener arm assembly 202 to be lowered.

FIGS. 15 and 16 illustrates the agricultural implement 200 having the opener arm assemblies 202 in the raised position for transport. This allows for the agricultural implement 200 to be driven over a field that has been previously seeded without disturbing the seed bed. The biasing hydraulic ram 12 is controlled by a plurality of electric and/or hydraulic valves 112 (see FIGS. 9 & 20). This allows the operator to selectively raise either a single or multiple opener arm assemblies 202 from the cab of the vehicle.

The agricultural implement 200 of the present invention is also contemplated as being configured such that it comprises only a plurality of single ground-engaging openers 3 and corresponding product delivery hose/tubes 18 and cutting knives 17 such that the agricultural implement 200 only delivers seed or fertilizer.

In another important preferred refinement of the present invention, a GPS ("global positioning system) or GNSS (global navigate satellite system) control system (not shown) is provided to automatically control the opening and closing of the gates 4 of the meter shut-off devices 35a, 35b, as well as the raising and lowering of the opener arm assemblies 202 for the agricultural implement 200 of the present invention.

Specifically, such GPS control system allows automatic control of not only coils 102 for controlling the meter valves 111 which in turn actuate/control hydraulic cylinder actuators 80 and thus associated gates 4 on meter shut-off devices 35a, 35b, but as well controls coils 104 for shank hydraulic valves 112, which in turn control the biasing hydraulic rams 12 on the opener arm assemblies 202 to raise selected opener arm assemblies 202 for areas that are mapped using the GPS system and known to already have be seeded, to thus prevent disturbing an already-planted seed bed. (see FIG. 19 and FIG. 20 herein).

In this regard, at least one GPS control system of the prior art may be specially adapted for the purpose of the present invention, namely the AutoSPRAY™ 7500 model controller manufactured by Rinex Corporation of South Perth, Western Australia (www.rinex.com.au/autospray.com).

Specifically, the AutoSPRAY™ 7500 model controller and associated GPS receiver has been used in the prior art for controlling spray nozzles of agricultural sprayers (such as that depicted in U.S. Pat. No. 6,053,019 manufactured by Case Corporation (now Case/New Holland), used to apply herbicide or liquid fertilizer to crops.

In the manner that a GPS receiver of the prior art has been used to provide data and input to the prior art AutoSPRAY 7500 model controller, which in turn de-activates spray nozzles 22 located on a booms 28,30 of the device as shown in U.S. Pat. No. 6,053,019, where the GPS controller determines that portions of the crop have already been sprayed and activates solenoids to control (eg close) spray nozzles on booms 28, 30 to avoid "double-application" of herbicide, a GPS receiver and GPS controller such as the AutoSPRAY 7500 model controller may by used for the purposes of the present invention to control coils 102 which in turn control associated hydraulic cylinder actuators 111 which in turn control individual gates 4 on meter shut-off devices 35a, 35b, as well simultaneously control coils 104 is used to control hydraulic valves 112 and thereby control/actuate hydraulic ram cylinders 12 to effect appropriate raising of opener arm assemblies 202 when desired.

It should be recognized that while preferred embodiments of the present invention have been described, those skilled in the art will recognize a wide variation of structural and operational details without departing from the principals of the invention. Accordingly, for a full definition of the invention, reference is to be had to the claim

We claim:

1. An agricultural implement for injecting material into soil, wherein the material is seed, fertilizer, or seed and fertilizer, comprising:
   a central frame;
   a plurality of elongate mounting arms, mounted to said central frame, each adapted to be moved from a raised transport position to a lowered operating position;
   soil engaging means mounted on each of said mounting arms, adapted to engage soil when each of said mounting arms is in said operating position;
   material dispensing means on each of said mounting arms proximate said soil engaging means for dispensing said material into the soil;
   further comprising:
   material metering means in communication with said material dispensing means, adapted to regulate and meter said material to said material dispensing means;
   means for preventing flow of said material to selected of said material dispensing means during operation of said implement, wherein said means for preventing flow of said material to selected of said material dispensing means is responsive to input from received from a GPS or GNSS satellite navigation system which provides input to said means for preventing flow upon detection of regions of soil which have been previously traversed by said agricultural implement and injected with said material; and
   means for automated raising to said raised position selected of said mounting arms for which said flow of material to said material dispensing means thereon has been prevented due to said GPS or GNSS satellite navigation system having determined regions of soil which have been previously traversed by said agricultural implement and injected with said material.

2. The agricultural implement as claimed in claim 1, wherein said material metering means comprises a metering roller.

3. The agricultural implement as claimed in claim 1, wherein said material metering means further comprises a plurality of metering gates each moveable between an open and a closed position such that when a selected of said metering gates is in said closed position said material is prevented from flowing to corresponding material dispensing means, and when said selected of said metering gates is in said open position said material is permitted to flow to corresponding material dispensing means.

4. An agricultural implement as claimed in claim 3, further comprising actuator means associated with and operably coupled to each of said metering gates, adapted to permit movement of said associated metering gates from said open position to said closed position and vice versa.

5. An agricultural implement as claimed in claim 4 wherein said actuator means is an actuator means selected from the group of actuator means comprising electrically operated actuator means, hydraulically operated actuator means, and electric over hydraulic actuator means.

6. An agricultural implement as claimed in claim 4, wherein said GPS or GNSS guidance system causes one or more of said actuator means to move one or more associated metering gates from said open position to said closed position when said GPS/GNSS guidance system detects that a portion of said agricultural implement has recently previously traveled over a particular area.

7. The agricultural implement as claimed in claim 1, wherein said means for automated raising comprises a plurality of hydraulic cylinders operatively coupled to corresponding of said plurality of mounting arms to raise and lower said mounting arms, and further comprises means adapted to actuate said hydraulic cylinders upon receiving input from said GPS or GNSS guidance system.

8. An agricultural implement for injecting material, wherein the material is seed, fertilizer, or seed and fertilizer, into soil, comprising:
   a central frame;
   a plurality of elongate mounting arms, mounted to said central frame, each adapted to be moved from a raised transport position to a lowered operating position;
   soil engaging means mounted on each of said mounting arms, adapted to engage soil when each of said mounting arms is in said operating position and not to engage soil when in said raised position;
   material dispensing means on each of said mounting arms proximate said soil engaging means for dispensing said material into the soil;
   further comprising:
   material metering means adapted to regulate and meter said material to said material dispensing means on each of said mounting arms;
   a plurality of metering gates for preventing or permitting flow of said material to material dispensing means on each of said mounting arms;
   means for closing each of said metering gates so as to prevent flow of said material to selected of said material dispensing means during operation of said implement, wherein said means for closing relies on input from a GPS or GNSS satellite navigation system which provides input upon detection of regions of soil which have been previously traversed by said agricultural implement and injected with said material; and
   means for automated raising to said raised position selected of said mounting arms for which said flow of material to said material dispensing means thereon has been prevented due to input from said GPS or GNSS satellite navigation system as a result of having determine regions of soil which have been previously traversed by said agricultural implement and injected with said material.

9. The agricultural implement as claimed in claim 8, wherein said means for automated raising comprises a plurality of hydraulic cylinders operatively coupled to corresponding of said plurality of mounting arms to raise and lower said mounting arms, and further comprises means adapted to actuate said hydraulic cylinders upon receiving input from said GPS or GNSS satellite navigation system.

10. An agricultural implement for injecting material into soil, wherein the material is seed, fertilizer, or seed and fertilizer, comprising:
  a central frame;
  a plurality of elongate mounting arms, mounted to said central frame, each adapted to be moved from a raised transport position to a lowered operating position;
  soil engaging means mounted on each of said mounting arms, adapted to engage soil when each of said mounting arms is in said operating position;
  a sectional meter shut-off apparatus comprising:
    (i) metering means for metering said material for subsequent delivery to said soil;
    (ii) a plurality of metering gates each individually moveable from an open to a closed position and vice versa to control flow of said material from said metering means;
    (iii) a plurality of outlets which may be individually opened or closed by said metering gates so as to permit or prevent metered flow of said material;
  material dispensing means on each of said mounting arms proximate said soil engaging means for dispensing said material into the soil;
  a GPS or GPNS satellite navigation system for mapping areas of soil which have been injected with material by said implement;
  automated means for opening and closing said metering gates in said sectional meter shut-off apparatus in accordance with input received from said GPS or GPNS satellite navigation system; and
  means for automated raising to said raised position selected of said mounting arms for which said flow of material to said material dispensing means thereon has been prevented due to input from said GPS or GNSS satellite navigation system as a result of having determined regions of soil which have been previously traversed by said agricultural implement and injected with said material.

11. The agricultural implement as claimed in claim 10, wherein said metering means comprises a metering roller.

12. The agricultural implement as claimed in claim 11, wherein
  said metering means comprising a metering roller for metering said material;
  said plurality of metering gates positioned along a top of the metering roller, said metering gates each moveable between an open and closed position wherein when each of said gates is in said closed position said material is not permitted to access the metering roller and when each of said gates is in said open position said material is permitted to access the metering roller.

13. The agricultural implement as claimed in claim 11, wherein said means for automated raising comprises a plurality of hydraulic cylinders operatively coupled to corresponding of said plurality of mounting arms to raise and lower said mounting arms, and further comprises means adapted to actuate said hydraulic cylinders upon receiving input from said GPS or GNSS satellite navigation system.

14. The agricultural implement as claimed in claim 10 further comprising actuator means associated with and operably coupled to each of said metering gates, adapted to permit movement of said associated metering gate from said open position to said closed position and vice versa.

15. An agricultural implement as claimed in claim 14 wherein said actuator means is an actuator means selected from the group of actuator means comprising electrically operated actuator means, hydraulically operated actuator means, and electric over hydraulic actuator means.

16. An agricultural implement as claimed in claim 15, wherein said GPS or GNSS satellite navigation system causes one or more of said actuator means to move one or more associated meter gates from said open position to said closed position when said GPS/GNSS satellite navigation system detects that said agricultural implement has recently previously traveled over a particular area.

17. A method of operating a seeder or fertilizer implement for automatically avoiding over-seeding or over-fertilizing of previously seeded or fertilized areas and further avoiding disturbing already seeded or fertilized areas, comprising the steps of:
  (i) providing:
    a central frame;
    a plurality of elongate mounting arms, mounted to said central frame, having raising means operatively coupled to each to permit said mounting arms to be moved from a lowered operating position to a raised transport position;
    soil-engaging means mounted on each of said mounting arms, adapted to engage soil when each of said mounting arms is in said operating position;
    material dispensing means on each of said mounting arms proximate said soil engaging means for dispensing said seed or fertilizer to said soil-engaging means and thereafter into said soil;
    material metering means in communication with said material dispensing means, adapted to regulate and meter said material to said material dispensing means;
    a GPS or GNSS satellite navigation system which provides an indication upon detection of regions of soil which have been previously traversed by said agricultural implement and injected with said seed or fertilizer;
  (ii) obtaining input from said GSP or GNSS satellite navigation system upon detection by said GSP or GNSS satellite navigation system of regions of soil about to be or being traversed by said implement which have been previously traversed by said implement and injected with said seed or fertilizer;
  (iii) preventing, upon said detection by said GPS or GNSS system, flow of seed or fertilizer to selected material dispensing means which would otherwise dispense said seed or fertilizer into regions of soil which have previously been traversed and injected with said seed or fertilizer by said agricultural implement; and
  (iv) raising, via said raising means, selected mounting arms to which flow of said seed or fertilizer to material dispensing means thereon has been prevented, so as to prevent said soil-engaging means thereon from engaging said regions of soil which have been previously traversed by said agricultural implement and injected with said seed or fertilizer.

* * * * *